United States Patent
Russell

(10) Patent No.: US 6,826,600 B1
(45) Date of Patent: Nov. 30, 2004

(54) METHODS AND APPARATUS FOR MANAGING OBJECTS IN A CLIENT-SERVER COMPUTING SYSTEM ENVIRONMENT

(75) Inventor: Paul J. Russell, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 09/704,488

(22) Filed: Nov. 2, 2000

(51) Int. Cl.$^7$ .............................................. G06F 15/167
(52) U.S. Cl. ..................... 709/213; 704/203; 704/214; 704/200; 704/205; 704/215
(58) Field of Search ................................ 709/203, 200, 709/217, 233, 214, 215, 205, 213

(56) References Cited

U.S. PATENT DOCUMENTS

| | | | |
|---|---|---|---|
| 5,008,853 A | 4/1991 | Bly et al. | 364/900 |
| 5,220,657 A | 6/1993 | Bly et al. | 395/425 |
| 5,515,491 A | 5/1996 | Bates et al. | 395/155 |
| 5,522,077 A * | 5/1996 | Cuthbert et al. | 707/103 R |
| 5,884,035 A | 3/1999 | Butman et al. | 395/200.48 |
| 6,209,018 B1 * | 3/2001 | Ben-Shachar et al. | 709/105 |
| 6,289,382 B1 | 9/2001 | Bowman-Amuah | 709/226 |
| 6,425,005 B1 | 7/2002 | Dugan et al. | 709/223 |
| 6,438,594 B1 | 8/2002 | Bowman-Amuah | 709/225 |
| 6,446,113 B1 | 9/2002 | Ozzie et al. | 709/204 |
| 6,463,460 B1 * | 10/2002 | Simonoff | 709/203 |
| 6,539,403 B2 | 3/2003 | Cho et al. | 707/203 |

* cited by examiner

Primary Examiner—Hosain Alam
Assistant Examiner—Ben Bruckart
(74) Attorney, Agent, or Firm—Chapin & Huang, LLC; Barry W. Chapin, Esq.

(57) ABSTRACT

Mechanisms and techniques allow computer systems to create and exchange uniquely identified shared objects. Using this invention, a client computer system can operate client software to generate local object definitions in a local object specification. To assure that the local object definitions created by the client are uniquely identifiable by this client, as well as by a server and possibly other clients which may require access to such object definitions (e.g., other clients in a collaboration software system), the invention allows the client to send the local object specification to the server for unique identification of the object definitions. The server receives the local object specification containing the local object definitions created by the client and can convert each local object definition within the local object specification to a global object definition in a global object specification. Each global object definition includes a system-wide unique global object identification assigned by the server that uniquely identifies the global object definition on the server, as well across any clients in communication with the server. The server then returns the global object specification containing the uniquely identified global object definitions to the client. The client then compares the global object specification to the local object specification to determine if the server properly created the global object specification based on the local object specification. Assuming the server properly creates the global object specification, the client replaces the local object specification with the global object specification such that the client can operate on global object definitions that are guaranteed to be uniquely identified.

46 Claims, 9 Drawing Sheets

METHODS AND APPARATUS FOR MANAGING OBJECTS IN A CLIENT-SERVER COMPUTING SYSTEM ENVIRONMENT

FIELD OF THE INVENTION

The present invention generally relates to mechanisms and techniques for managing objects in a client-server computing system environment, and more particularly, to systems and techniques which allow for the creation and management of uniquely identified objects in such an environment.

BACKGROUND OF THE INVENTION

The rise in popularity of computer networks such as the Internet has led software application developers to develop complex software applications which interact between different computer systems over the network. One example of such a software application is collaboration software which allows respective users of two or more computer systems to exchange information during a collaboration session. In a collaboration session, if a user on one computer system enters information or manipulates an image on that user's computer display, the collaboration software conveys such information or image manipulations to recipient computer systems under control of other participants (i.e., other users) involved in the collaboration session. The recipient computer systems receive the information or image manipulations and attempt to duplicate or recreate the information or image manipulations on the computer display(s) of the recipient computer systems for viewing by the participants controlling such computer systems. In this manner, actions taken by one participant involved in the collaboration session can be witnessed by other participants in the collaboration session.

Collaboration software systems such as the example discussed above are often designed based on a client/server software design model. Software designer refer to the collaboration software that performs on the participant or user computer systems as client collaboration software, while other collaboration software that resides and performs within a collaboration adapter or collaboration server computer system to handle distribution of collaboration information between the respective user computer systems involved in the collaboration session is called server collaboration software.

Generally, client/server software systems such as collaboration systems support the exchange of information between a client and a server using some type of protocol or handshaking process which passes or transfers data structures between the client and server software components. Many implementations of client/server software systems use an object oriented software model or architecture which allows the client and server software to exchange data as a series of one or more objects. An object might, for instance, encapsulate information such as a size, position, direction of movement and so forth about a particular entity such as a graphic that is related to the collaboration session. Object oriented client/server software systems are not limited to collaborations systems, though collaboration systems serve as a suitable example for discussing the operations of object oriented client/server software systems.

By way of example, consider the operation of an object oriented client server collaboration software system that operates to provide a collaboration session between multiple participant users. Suppose one user on a user computer system involved in the collaboration session creates a graphic or image on the display of his or her user computer system. The client collaboration software on that user's computer system will create a graphic object for that graphic and will assign an object identification to the graphic object. The graphic object might define, perhaps, the size, shape and position of the graphic on the display of the user computer system. After creation of the graphic object, the client collaboration software will then provide a copy of the graphic object to the server collaboration software that operates on the collaboration server computer system (also called a collaboration adapter). The server collaboration software will receive the graphic object and will place the graphic object in an object database with other objects possibly created by other client computer systems involved in the collaboration session. The server collaboration software periodically distributes the objects (e.g., the graphic object) in the object database to the client computer systems that are participating in the collaboration session so that the client collaboration software can display or otherwise operate on the set of objects related to the collaboration session.

In this manner, a client can create objects and provide the objects to the server and the server can distribute objects created by clients to other clients such that each client receives a copy of the objects related to the collaboration session. The server computer system operating the server collaboration software thus operates as a central repository for all objects created and identified by clients during the collaboration session. Should client collaboration software operating on another client computer system join a collaboration session already in progress, the server collaboration software can distribute the current set of objects related to the collaboration session to the client collaboration software on the client computer system such that the new participant user can immediately come up to speed and join in with the other participants in the collaboration session.

SUMMARY OF THE INVENTION

Conventional object oriented client/server software systems that provide object creation and management techniques suffer from a number of deficiencies. Most notably, conventional object oriented client/server software systems do not include a mechanism that ensures or guarantees uniqueness of shared objects in such systems.

By way of example, consider the object oriented client/server collaboration software system discussed above. In such a system, the client software (i.e. client collaboration software in this example) creates objects and assigns properties to the objects including the individual object identification for that object. The client software might generate the object identification for a particular object based on an algorithm that ensures that the object identification is unique within that client. However, once the client collaboration software forwards objects which it creates in this manner to the server collaboration software which maintains the objects in the object repository (e.g., an object database), there is no guarantee that the object identifications created by the client will be unique in relation to all other objects created by all other clients involved in collaboration session. It may be the case, for example, that a second client generates a second object containing the same object identification as the first object created by the first client. When the second client transfers the second object to the collaboration server for placement into the object database, the first and second objects will each contain the same object identification. This may cause the server collaboration software to be confused as to which object is to be obtained, manipulated or otherwise operate upon when a client refers to the object identification shared by two or more objects in the object database.

Conventional client/server object management techniques also provide insufficient mechanisms for a client to determine that a server accurately creates and manages the objects which a client provides to the server. For instance, in conventional collaboration systems, when the client collaboration software creates a number of objects, each containing a client object identification, and then provide the client objects to the server for distribution to other clients in a collaboration session, the client performs little if any verification processing to verify that the server collaboration software properly receives and manages the objects created by the client. This problem is associated in part to the aforementioned problem in which to objects might potentially share the same object identification in a conventional collaboration system. That is, if a client were to provide a set of objects to a server for distribution to other clients involved in a collaboration session, and one or more of the objects in the set had in object identification that was the same as an object identification of one or more other objects already in the object database on the server, in the server might become confused and might, for instance, overwrite or replace the first object with a second object having an object identification that is the same as the first object. As such, conventional collaboration systems do not provide the client with the ability to verify that the server has properly accounted for and managed all objects presented to the server from a client.

To this end, conventional object oriented client/server software systems do not provide a way to uniquely identify shared objects across all clients and servers which may have access to such shared objects, nor do such systems provide an integrated mechanism that authenticates or verifies that the server collaboration software has accounted for all objects presented to the server from the client collaboration software.

Conversely, the present invention overcomes such deficiencies and provides mechanisms and techniques which allow for the creation and management of objects that each contain a unique object identification. System of the invention guarantees that an object identification for an object will be unique across all clients and/or servers that may require access to the object. In this manner, clients can create objects that may always be differentiated from each other based on their object identifications. In the system of the invention, during the process of creating uniquely identify the objects, the system of the invention also provides a technique to ensure that the server properly create and manages the precise set of objects the client provides the server. In other words, during the process of creating a set of objects having a unique object identification across all clients in the server, the system of the invention also provides techniques which allow the client to guarantee that the server has properly accounted for and created (e.g., in the object database within the server) precisely the set of objects which the client initially provided to the server. In this manner, the client is assured that the server will distribute an exact corresponding set of uniquely identifies objects to other clients, for example, which may be participating in a collaboration session.

Once a uniquely identified set of objects (referred to herein as a global object specification) is created according to the techniques of the invention, the system of the invention also ensures that the unique objects are distributed to all client computer systemsthat require access to such objects. For example, in the collaboration software system environment, the system of the invention allows client collaboration software to create uniquely identified objects and to provide those objects to a collaboration server computer system for distribution to other clients in the collaboration session.

In this invention, the client computer systems are still responsible for creating objects. However, the server computer system is responsible for selecting a global object identification for an object instead of the client and the server is able to authenticate to the client the objects which the server manages on behalf of the client. By providing a centralized object identification and management mechanism within a server computer system, the invention guarantees that all object identifications are unique no matter which client created such objects and guarantees that the server properly manages (i.e., creates and distributes) all objects as instructed by the clients.

More specifically, the present invention provides method and apparatus embodiments to handle the creation and management of objects. According to one particular method embodiment, a method is provided in a client computer system for defining objects. The method comprises the steps of providing a local object specification to a server and receiving a global object specification from the server. The global object specification includes at least one global object definition having a unique global object identification. The method then generates a signal indicating whether the global object specification and the local object specification define common object definitions. This method is preferably carried out by a client software process configured in accordance with embodiments of the invention. Using this technique, a client can generate set of objects and provide those objects to a server and receive a global object specification in response that corresponds to the original set of objects. Each object is then guaranteed to be uniquely identified on both the client and the server as well as on any other clients which may access the objects thereafter.

In another related embodiment of the invention, the step of providing the local object specification to the server includes the steps of reserving an object creation right with the server and in response to reserving the object creation right with the server, defining the local object specification to include at least one local object definition and a corresponding local object identification that is unique to the at least one local object on the client. The method then transfers the local object specification to the server. By reserving an object creation right with the server, the method allows a client to reserve the server for the process of creating uniquely identified objects according to this invention.

In another embodiment, the step of reserving an object creation right with the server includes the step of checking for an existence of an object specification on the server, and if no object specification exists on the server, creating a reservation object specification on the server in order to reserve the object creation right with the server on behalf of the client, and if an object specification exists on the server, receiving a denial of the object creation right for the client. The reservation object specification operates as a placeholder on behalf of the client placing such an object on the server in order to reserve the server to attend to the processing tasks of this invention which create a unique set of global objects.

In another embodiment, the step of generating a signal indicating whether the global object specification and the local object specification define common object definitions includes the step of checking whether the global object specification contains a corresponding global object definition for each respective local object defined in the local object specification. If the global object specification contains a corresponding global object definition for each respective local object defined in the local object specification, then the method replaces the local object specification in the client with the global object specification received from the server. If the global object specification does not contain a corresponding global object definition for each respective local object defined in the local object specification, then the method provides an indication of an error to the server.

In a further embodiment, the signal indicates that the global object specification and the local object specification define common object definitions. In this embodiment, the method further comprises the step of, in response to the signal indicating that the global object specification and the local object specification define common object definitions, providing a confirmation of acceptance of the global object specification to the server to indicate to the server to send an update to other clients such that the other clients can create objects in conjunction with the server and releasing the object creation right with the server. Thus, once a client uses the techniques of the invention in conjunction with a server to generate a global object specification containing a set of unique global object definitions, the client can indicate acceptance of these unique global object to the server which can then allow other clients to obtain the same set of global object definitions in the global object specification. If the invention is implemented, for example, in a collaboration software system, this allows client collaboration software processes to obtain the set of shared global object definitions which are each uniquely identified across all clients and the server.

In still another embodiment, the step of releasing the object creation right with the server comprises the step of providing an indication to the server to delete a reservation object specification on the server that reserve the object creation right with the server on behalf of the client. Thus once a client accepts the global object specification, the client can release the server so that the server can process object requests on behalf of other clients.

In another embodiment, the step of receiving the global object specification receives a global object specification containing global object definitions that correspond to respective local object definitions in the local object specification. The global object definitions have respective global object identifications that are unique amongst all global object definitions created by the server. Accordingly, a client does not need to be concerned than object my contained in object identification that is duplicated elsewhere such as on the server or on another client.

In a further embodiment, the client is client collaboration software performing on a client computer system involved in a collaboration session with the server and the server is collaboration adapter software operating on a collaboration computer system. In this embodiment, the method further comprises the step of, in response to determining that the server properly created the global object specification, providing confirmation of acceptance of the global object specification to the server such that the server can update the global object specification of other client computer systems performing client collaboration software such that all clients involved in the collaboration session with the server contain the global object definitions having unique global object identifications.

Other embodiments of the invention relate to object processing that takes place by a server software process executing in conjunction with a processor on a server computer system. One such embodiment provides a method for defining objects. The method comprises the steps of receiving a local object specification from a client. Then, for each local object definition in the local object specification, defining, within a global object specification, a corresponding global object definition including a unique global object identification, and then providing the global object specification to the client. In this manner, a server performing this method can generate a global object specification based on a local object specification provided to the server from a client, in the global object specification with contain global object definitions which are each uniquely identified.

In another related embodiment, the step of defining, within a global object specification, a corresponding global object definition including a unique global object identification comprises the steps of creating a global object definition that contains object properties equivalent to object properties of the local object definition to which the global object definition corresponds, generating an object identification for the unique global object identification that is unique amongst all global object identifications assigned to any existing global object definitions known to the server, and then assigning the unique global object identification to the global object definition such that the global object definition is uniquely identified amongst all global object definitions. Using this technique, a server is able to produce global object definitions which are each uniquely identified across all clients as well as within the server.

In a further embodiment, the step of creating a global object definition that contains object properties equivalent to object properties of the local object definition to which the global object definition corresponds comprises the step of copying the local object definition in the local object specification to a global object definition within the global object specification to generate the global object definition which is a copy of the local object definition. Also in this embodiment, the step of assigning the unique global object identification to the global object definition replaces the local object identification copied to the global object definition with the unique global object identification generated by the step of generating an object identification for the unique global object identification.

In still another embodiment, the method includes the step of associating the global object definition to the global object specification. In this manner, the server can duplicate local object definitions and can replace local object identifications in those definitions with a global object identification which is assured to the uniquely identifiable.

Another embodiment includes the steps of receiving, from a client, a request to reserve an object creation right on the server, and checking if the client is able to create an object on the server. If the client is able to create an object on the server, the method returns an object creation right to the client, and if the client is not able to create an object on the server, the method provides a denial of the object creation right to the client.

In another embodiment, the step of receiving, from a client, a request to reserve an object creation right on the server comprises the step of receiving an attempt to create a reservation object specification from the client in order to reserve the object creation right with the server on behalf of the client. If the step of checking if the client is able to create an object on the server determines that the client is able to create an object in the server, the method further includes the step of creating a reservation object specification on the server in order to reserve the object creation right with the server on behalf of the client. Using this technique, a client can reserve the server for interaction with that client during the process of creating a global object specification.

Still another embodiment of the invention includes the steps of, in response to returning the object creation right to the client, receiving, from a client, a reservation object specification on the server that reserves the object creation right on behalf of the client and creating the reservation object specification on the server in order to reserve the object creation right with the server on behalf of the client.

In still another embodiment, the method includes the steps of receiving a confirmation of acceptance of the global object specification provided to the client and providing a global object specification update to other clients such that the other clients can retrieve the global object specification from the server. In this manner, when the server receives confirmation from the client that the global object specification is acceptable, the server can provide an indication to other clients to update their object specifications with the new global object specification.

In still another embodiment the method includes the steps of receiving a request from the other clients for the global object specification and in response to receiving the request from the other clients for the global object specification, providing the global object specification to the other clients. When a server of the invention performs this method embodiment, other clients can request a global object specification update from the server in the server will provide all clients with the latest version of the global object specification.

Another embodiment of the invention provides a method for defining shared objects on a client and a server. This method embodiment comprising the steps of providing, from the client, a local object specification to the server and receiving, in the server, the local object specification from the client. In the server, for each local object definition in the local object specification, the method defines, within a global object specification, a corresponding global object definition including a unique global object identification. The method then provides, from the server, the global object specification to the client and receives, at the client, the global object specification from the server. The method then compares, in the client, the global object specification to the local object specification to determine that the server properly created the global object specification based upon the local object specification. If the server properly created the global object specification, the method replaces the local object specification in the client with the global object specification received from the server. If the server improperly created a global object specification, the method provides, from the client, an indication of an error to the server.

Other embodiments of the invention include, in a client computer system, a method for performing object operations. The object operations may include deleting or creating global object definitions from existing global object specification. One such method comprises the steps of providing an object operation to a server from a client performing on the client computer system and receiving, at the client, a global object specification update from the server. The global object specification update indicates that the server performed the object operation on a global object specification maintained by the server. In response to receiving the global object specification update, the method performs the object operation on a global object specification maintained by the client.

Using this technique, once a client is in possession of a global object specification, the client can perform object operations such as creating or deleting an object definition in the global object specification by first instructing the server to perform such object operations and then, upon receiving confirmation from the server that such object operations have been performed on the global object specification maintained within the server, the client can perform a corresponding object operation on a global object specification maintained by that client. This ensures that a client will not first perform an object operation on its global object specification while then having the server fail to perform such an operation. In other words, this technique guarantees that the server will carry on object operation before all clients, for example, that are involved the collaboration session carry out a corresponding object operation.

In another embodiment, the object operation is a create object operation and the step of providing the object operation to a server comprises the steps of defining at least one object property for a global object definition to be created by the server and providing the object operation to the server including the one object property. The object property may specify, for example, a particular type of object that the server is to create. Also in this method, the step of receiving receives the global object specification update containing a new global object identification for a new global object definition to be created in the global object specification in the client computer system. The new global object identification is a global object identification assigned by the server to the new object definition which the server creates in the global object specification maintained by the server. This new object definition contains the object property specify to the server by the client in the object operation. Also in this method, the step of performing the object operation on a global object specification maintained by the client includes the step of generating the global object definition within the global object specification on the client computer system. The global object definition contains the object property and contains the global object identification received from the global object specification update. In this manner, the client creates an object definition containing the object property as well as the global object identification provided from the server, after confirmation that the server created the same object definition in its global object specification.

In another embodiment, the object operation is a delete object operation and the step of providing the object operation to a server comprises the steps of defining at least one object property for a global object definition to be deleted from a global object specification maintained by the server and providing the object operation to the server including the object property. Also in this method, the step of receiving receives the global object specification update containing a global object identification of an existing global object definition in the global object specification in the client computer system. Also, the step of performing the object operation on a global object specification maintained by the client includes the step of removing a global object definition within the global object specification that corresponds to the global object identification received from the global object specification update.

Other embodiments of the invention include client computer systems configured to perform all of the method embodiments summarized above with respect to client processing and explained herein as the invention. In particular, such client computer system embodiments include an interface, a processor, a memory system and an interconnection mechanism coupling the interface, the processor and the memory system. The memory system is encoded with an client object manager process that, when performed on the processor, operates as a client to cause the client computer system to define shared objects by performing the operations of the client method embodiments of the invention. That is, the invention includes client computer systems configured to perform all of the method operations of the client embodiments disclosed herein.

Other embodiments of the invention include server computer systems configured to perform all of the method embodiments summarized above with respect to server processing and explained herein as the invention. In particular, such server computer system embodiments include an interface, a processor, a memory system and an interconnection mechanism coupling the interface, the processor and the memory system. The memory system is encoded with an server object manager process that, when performed on the processor, operates as a server to cause the server computer system to define shared objects by performing the operations of the server method embodiments of the invention. That is, the invention includes server computer systems configured to perform all of the method operations of the server embodiments disclosed herein.

Generally, embodiments of the invention can perform all of the client and server methods disclosed herein via software control, or via hardware and/or software configured to perform those methods and the techniques.

Other embodiments of the invention that are disclosed herein include software programs to perform the client and server operations summarized above and disclosed in detail below. More particularly, a computer program product is disclosed which has a computer-readable medium including computer program logic encoded thereon to provide the methods for defining shared objects according to this invention. The computer program logic, when executed on at least one processor within a client or server computing system, causes the processor to perform the operations (e.g., the client and server method embodiments above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the object processing techniques and mechanisms of this invention typically perform (e.g., execute, run, or are otherwise operated) on and between client and server computer systems coupled to a computer network.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques and mechanisms that allow computer systems to create and exchange uniquely identified shared objects. Using this invention, a client computer system can operate client software (referred to simply as a client when operating such software) to generate any number of local object definitions. The client maintains the local object definitions as a set in a local object specification. To assure that the local object definitions created by the client are uniquely identifiable by this client, as well as by a server and possibly other clients which may require access to such object definitions (e.g., other clients in a collaboration software system), the invention allows the client to send the local object specification to the server for unique identification of the object definitions. The server receives the local object specification containing the local object definitions created by the client and can convert each local object definition within the local object specification to a global object definition in a global object specification. Each global object definition includes a global object identification assigned by the server that uniquely identifies the global object definition on the server, as well across any clients in communication with the server. The server can then return the global object specification containing the uniquely identified global object definitions to the client. The client can then compare the global object specification to the local object specification (still in the client) to determine if the server properly created the global object specification based on the local object specification (e.g., to be sure that the server created a global object definition for each local object definition that the client initially provided to the server). Assuming the server properly creates the global object specification, the client replaces the local object specification with the global object specification such that the client can operate on (e.g., can manipulate or otherwise reference) global object definitions that are guaranteed to be uniquely identified.

Using the mechanisms and techniques of the invention as explained herein, client/server software developers can create object oriented software systems that share uniquely identified objects between clients and servers without being concerned with duplicate object identifications. This avoids the problems noted above that exist in conventional object oriented client/server software systems in which it may be possible for two objects to have the same object identification. Since the invention centralizes generation and assignment of object identifications at the server, instead of at the clients (as in conventional systems), the system of the invention can use a single set of non-replicated global object identifications for assignment to object definitions created by clients.

Figure 1:
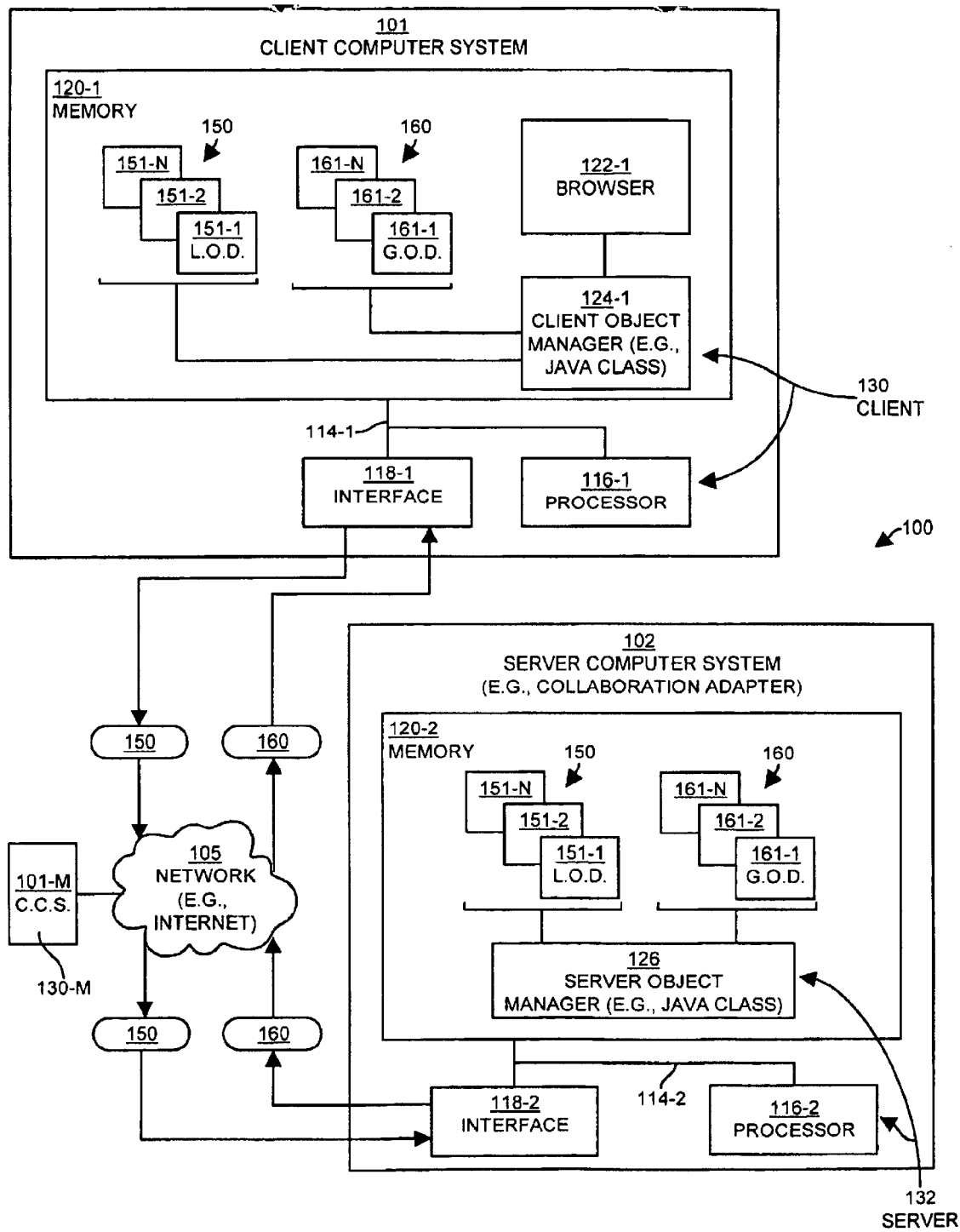
FIG. 1 illustrates client computer systems and a server computer system in a computing system environment that is suitable for use in describing example operations of embodiments of the invention.

FIG. 1 illustrates an example of a computing system environment 100 configured in accordance with an embodiment of the invention. The computing system environment 100 includes a computer network 105, such as the Internet, which couples client computer systems 101 through 101-M and a server computer system 102. Only the client computer system 101 is shown in detail in this example. It is to be understood that the other client computer systems 101-M are configured in a similar manner. In this example, both the client computer system 101 and the server computer system 102 include an interconnection mechanism 114 which couples a processor 116, an interface 118 and a memory system 120. The memory system 120-1 within the client computer system 101 is encoded with software processes which include a browser process 122 and a client object manager 124. The processor 116-1 can perform (e.g., execute, interpret, run or otherwise operate) the client object manager 124 to provide a client 130. The memory system 120-2 in the server computer system 102 is encoded with a server object manager 126 software process. The processor 116-2 can perform (e.g., execute, interpret, run or otherwise operate) the server object manager 126 to provide a server 132. The client object manager 124 and the server object manager 126 are preferably logic instructions (e.g., software code) in the memory 120 that may be, for example, Java classes that operate (i.e., perform on the processors 116) in real-time to carry out the client and server functionality processing as explained herein between the client and server computer systems 101 and 102.

The memory systems 120-1 and 120-2 are also encoded with local object descriptions 151-1 through 151-N which collectively form a local object specification 150, and global object descriptions 161-1 through 161-N which collectively form a global object specification 160. An object description 151 or 161 includes one or more object properties (not specifically shown in this figure) that describe an object that software processes (e.g., browser 122, client 130, server 132) can operate upon (e.g., create, manipulate, delete and so forth) within the client computer system 101. In this example, one object property that all object descriptions 151, 161 contain is an object identification which software processes can use to reference or otherwise identify the object description 151 or 161. Accordingly, a simple object description may contain only an object identification property.

Though not required for this invention, the browser 122 is shown in the memory system 120-1 in this example as providing a mechanism for a user (not specifically shown) to interact with the client computer system 101 for the creation and manipulation of objects.

Generally, in this example embodiment, the processors 116-1 and 116-2 can perform (e.g., can execute, interpret, run or otherwise operate) logic instructions (e.g., code, not specifically shown) respectively associated with the client object manager 124 (processor 116-1) and server object manager 126 (processor 116-2) to provide the operations of the invention. In particular, the processor 116-1 can perform the client object manager 124 as a client 130 to create the local object specification 150 and to transfer the local object specification 150 through the network 105 to the server computer system 102 for assignment of unique object identifications to each local object definition 151 in the local object specification 150. The processor 116-2 can perform logic instructions associated with the server object manager 126 as a server 132 to receive the local object specification 150 and can generate a global object specification 160 based upon the local object specification 150. Generally, this server processing includes generating (e.g., creating core copying) a global object definition 161 for each local object definition 151 in the local object specification 150 and then assigning a unique global object identification (not specifically shown in this figure) to each global object definition 161. The server then returns the global object specification 160 to the client computer system 102 for use by the client object manager 124.

Figure 2A:
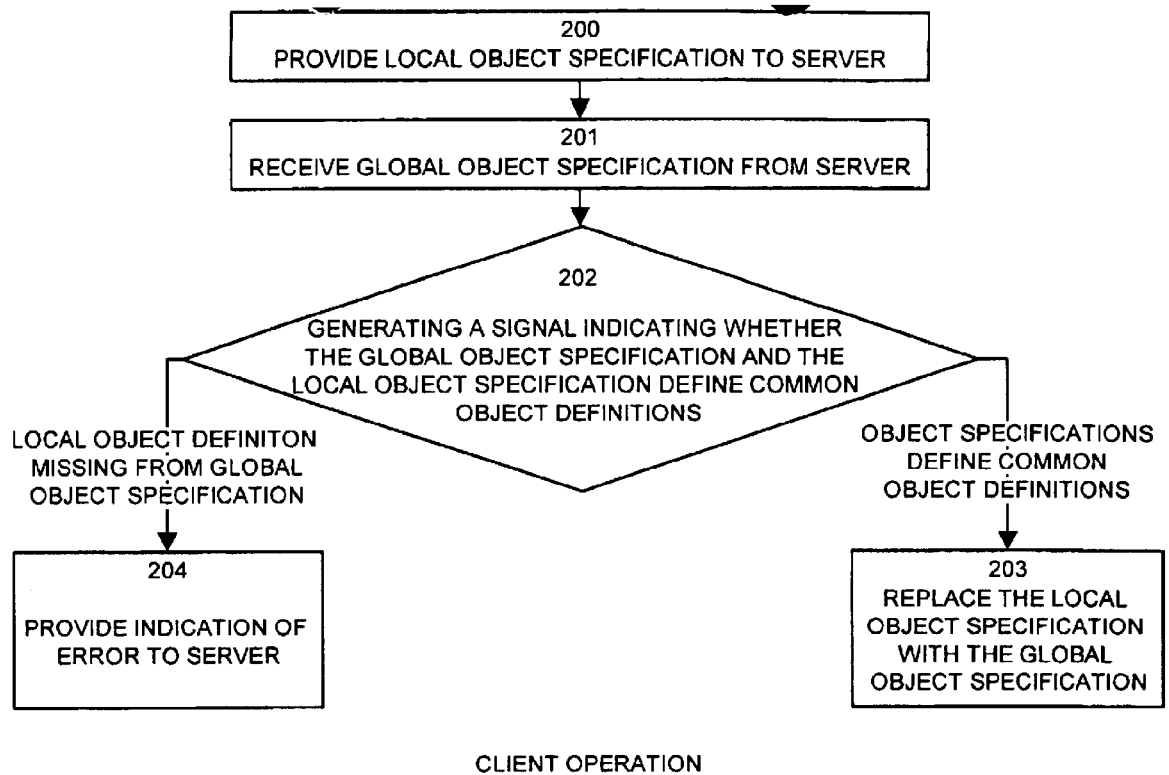
FIG. 2A illustrates a flow chart of processing operations as performed by a client object manager operating as a client within the client computer system configured in accordance with embodiments of the invention.
Figure 2B:
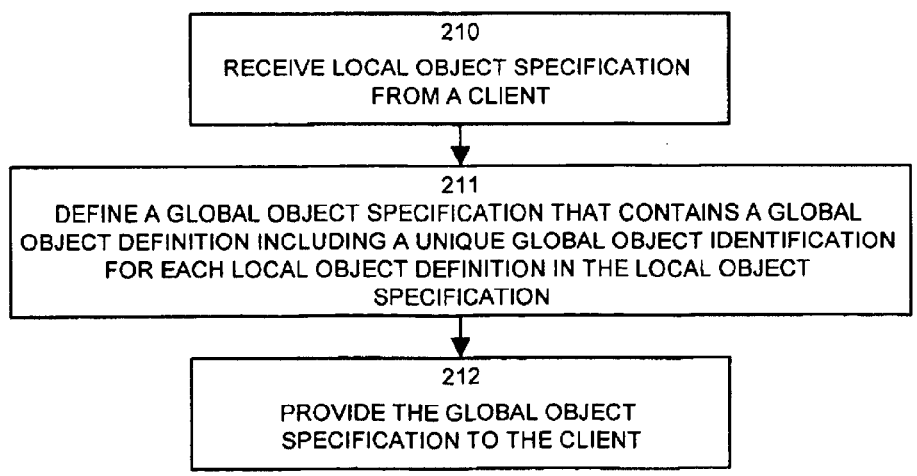
FIG. 2B illustrates a flow to our of processing operations as performed by a server object manager operating as a server within the server computer system configured in accordance with embodiments of the invention.

FIGS. 2A and 2B show the high-level processing steps that processors 116 carry out when performing (processor 116-1) operation of the client object manager 124-1 (FIG. 2A) as the client 130, and when performing (processor 116-2) the server object manager 126 (FIG. 2B) as the server 132 according to embodiments of the invention. The individual processing steps and operations shown in FIGS. 2A and 2B will be explained in greater detail later, in relation a specific example operation of a client 130 and server 132 according to one embodiment of the invention Referring to step 200 in FIG. 2A, the processor 116-1 performs the client object manager 124 as a client 130 to provide the local object specification 150 to the server 132 (i.e., the processor 116-2 in the server computer system 102 performs logic instructions of the server object manager 126). As noted above, the local object specification 150 includes one or more local object definitions 151-1 through 151-N which define local objects within the client computer system 101. Creation of a local object specification 150 will be explained in some detail later. For purposes of this description, it may be assumed that the local object specification 150 exists within the memory system 120-1. In step 200 then, the client 130 transfers or otherwise propagates the local object specification 150 defined within the memory system 120-1 on the client computer system 101 through the computer network 105 to the server computer system 102 for receipt by the server 132.

In step 201, the processor 116-1 further performs the client object manager 124 as a client 130 to receive a global object specification 160 from the server 132 that includes at least one global object definition 161 having a unique global object identification (not specifically shown in FIG. 1). The client 130 receive the global object specification 160 via interface 118-1 and places the global object specification 160 into the memory system 120-1. The creation of global object definitions 161 within a global object specification 160 will be explained shortly with reference to FIG. 2A and in more detail later with reference to other figures.

Next, in step 202, the client 130 generates a signal (not specifically shown in this figure) indicating whether the global object specification 160 and the local object specification 150 within the memory system 120-1 define common object definitions 151 and 161. The client 130 may perform step 202, for example, by comparing global object definitions 161 within the global object specification 160 created by the server 132 to corresponding local object definitions 151 within the local object specification 150 to be sure that the server 132 created a respective global object definition 161 for each local object definition 151. This processing assures the client 130 that the server 132 has properly accounted for (i.e., created a global object definition 161 for) all local object definitions 151.

If the client 130 in step 202 determines that the local and global object specifications 150, 160 each define common object definitions 151, 161 (e.g., there is a one-to-one correspondence between two object specifications), then the client 130 performs step 203 to replace the local object specification 150 in the memory system 120-1 with the global object specification 160. In this manner, the client 130 replaces local object definitions 151 with global object definitions 161 which are each guaranteed to contain a unique global object identification. Accordingly, the client 130 can also be assured that all global object definitions 161 are unique.

FIG. 2B shows the high-level processing steps that processor 116-2 carries out when performing operation of the server object manager 126 as the server 132.

In step 210, the server 132 (i.e., the processor 116-2 in the server computer system 102 performing the server object manager 126 as the server 132) receives a local object specification 150 from a client 130. The server 132 receives the local object specification 150 over the network 105 via the interface 118-2 in response to a client 130 performing step 200 (FIG. 2A). The server 132 places the local object specification 150 into the memory system 120-2 within the server computer system 102.

Next, in step 211, the server 132 defines a global object specification 160 containing at least one global object definition 161 that includes a unique global object identification (not specifically shown), for each local object definition 151 in the local object specification 150. In other words, in step 211, the server 132 generates, creates, copies or otherwise defines a respective global object definition 161-1 through 161-N for each local object definition 151-1 through 151-N that is defined within the local object specification 150 that the server 132 receives in step 210. During this process, the server 132, as will be explained in more detail shortly, generates a new and unique global object identification for each global object definition 161 that is defined for each corresponding local object definition 151.

Figure 3:
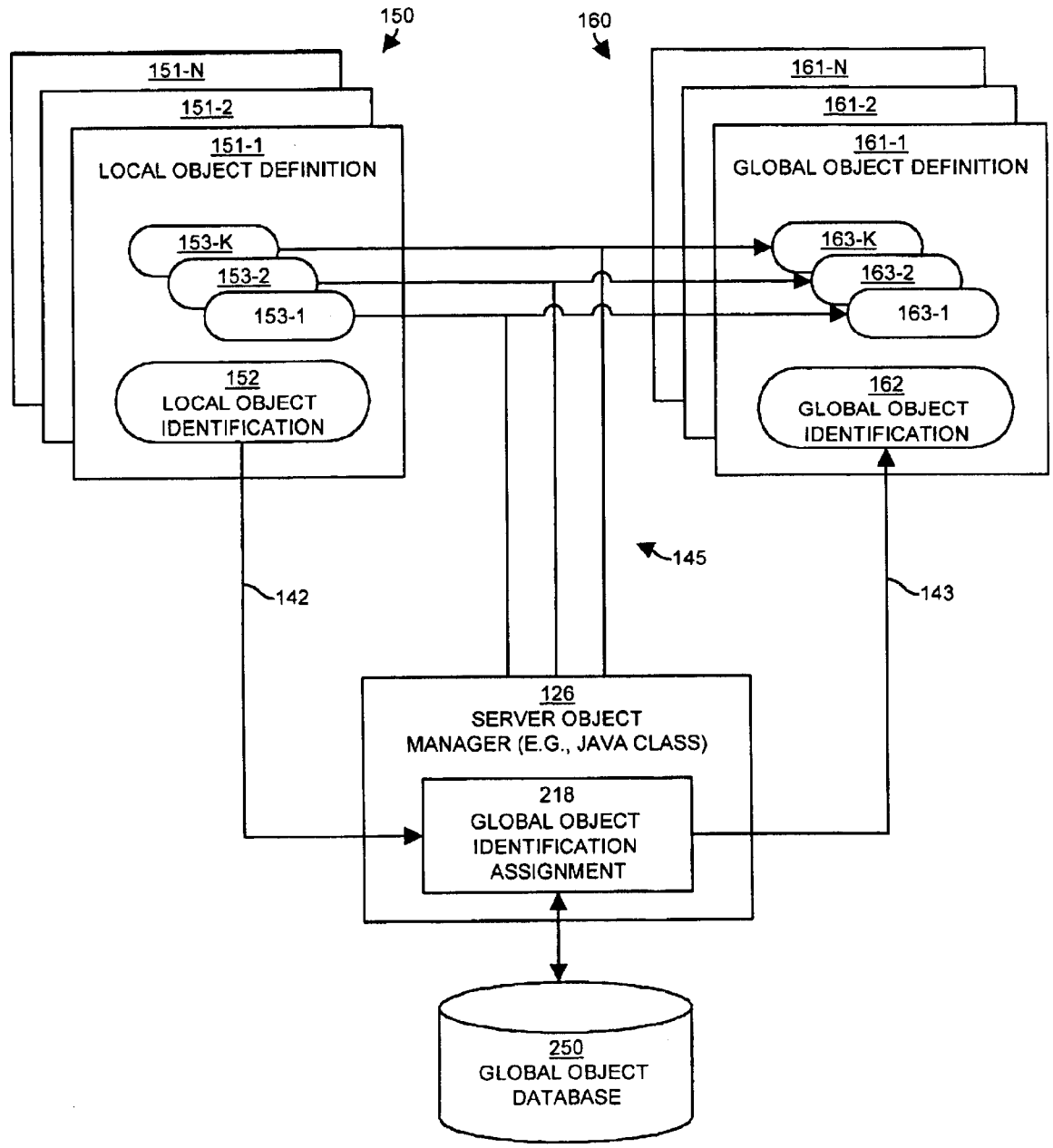
FIG. 3 illustrates how a server object manager operating as a server can generate a global object specification including global object definitions that contain unique global object identifications and that correspond with local object definitions contained in a local object specification created by a client, according to one embodiment of the invention.

FIG. 3 illustrates some details of the processing that the server 132 performs in step 211. As illustrated, each local object definition 151-1 through 151-N within the local object specification 150 includes one or more object properties 152 and 153-1 through 153-K. The object properties 152, 153 are shown only for the local object definition 151-1 in this example and it is to be understood that other local object definitions 151-2 through 151-N may contain the same or different object properties 153.

The object property 152 is a local object identification that identifies the local object definition 151-1 to the client 130. The client 130 generates a value for the local object identification property 152 when the client 130 first creates the local object definition 151-1. When the server 132 performs step 211 of FIG. 2B then, the processor 116-2 operates the server object manager 126 to duplicate 145 each local object definition 151 as a new global object definition 161, except for the local object identification property 152. In other words, the server object manager 126 operates as a server 132 to copy 145 all of the object properties 153-1 through 153-K from each respective local object definition 151-1 through 151-N into a set of respective global object properties 163-1 through 163-K in newly defined respective set of global object definitions 161-1 through 161-N (the global object specification 160).

The server object manager 126 includes a global object identification assignment function 218 which interfaces with a global object database 250. During execution, the global object identification assignment function 218 generates an object identification value from the global object database 250 to serve as the unique global object identification property 162. The unique global object identification 162 is an object identification value that is unique amongst all global object identifications 162 assigned to any existing global object definitions 161 known to the server 132. The server 132 performs the global object identification assignment function 218 in step 211 (FIG. 2B) to extract 142 the local object identification property 152 for each local object definition 151. Then, for each local object definition 151, the server 132 retrieves a new global object identification value from the global object database 250 and assigns this new value as the global object identification 162 for the new global object identification 161. In this manner, each global object definition 161 that the server 132 creates is essentially a duplicate of a corresponding local object definition 151 except that the server 132 replaces the local object identification 152 with a global object identification 162. In this manner, the server 132 can be certain that the global object identification 162 for each global object definition 161 is unique for every object definition 161.

Returning attention now to FIG. 2B, once the server 132 performs step 211 as explained above, processing proceeds to step 212 at which point the server 132 provides the new global object specification 160 back to the client 130. While not shown in these processing steps, the server 132 also maintains a copy of the global object specification 160 for distribution to other client computer systems (e.g., 101-M), as will be explained.

According to the aforementioned description, the operation of the client 130 and the server 132 allows a client computer system 101 to create objects as needed for an object oriented client/server software system without being concerned if an object identification associated with those objects is unique across all other clients and the server. Then, upon distribution of the object definitions from the client computer system 101 to server computer system 102, the server 132 assigns a new and unique global object identification to each of the object definitions created by the client 130 and then returns to a copy of those unique global object identifications as a global object specification 160 back to the client 130. Using these mechanisms and techniques, clients (e.g., client 130) are able to create objects as required and can then transfer these objects to the server which is responsible for providing a unique identification for the objects. These techniques are quite beneficial in object oriented client/server systems such as collaboration software systems in which many clients may create objects, some of which may contain local object identifications which are the same. Since the server 132 of the invention operates to replace any local object identifications 151 within a local object specification 150 with global object identifications 161 having a global unique identification 162 in a global object specification 160, the server 132 can guarantee that no two object definitions contain the same global object identification 162.

Figure 4:
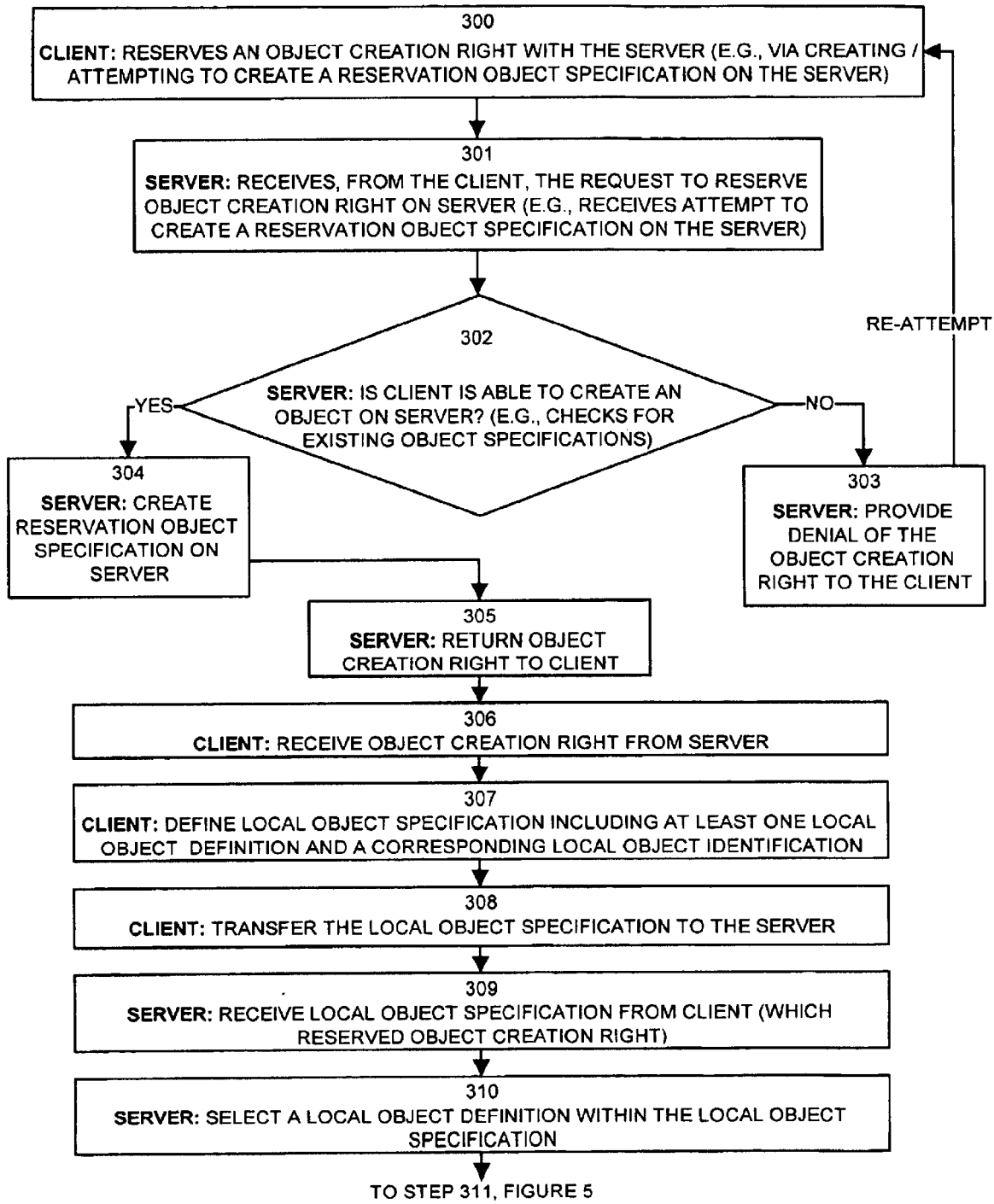
FIGS. 4 and 5 illustrates a flow chart of processing steps to create and distribute objects as performed by both a client and a server configured according to embodiments of the invention.
Figure 5:
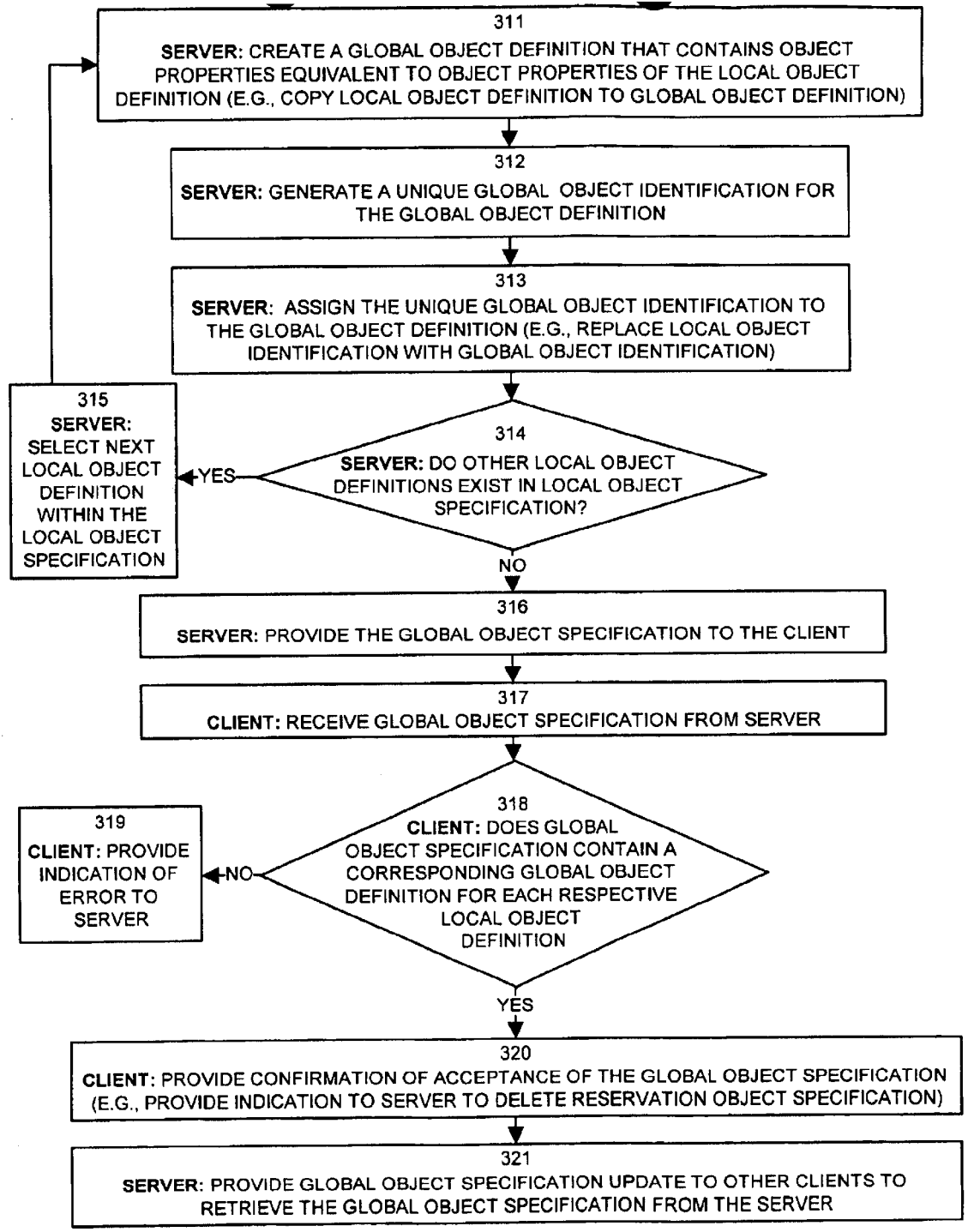

FIGS. 4 and 5 provide a flow chart of processing steps that show a more detailed example of the operation and interaction between the client 130 and a server 132 in accordance with an example embodiment of the invention. This example processing is useful in explaining certain details and alternative configurations of embodiments of the invention. Each of the processing steps in FIGS. 4 and 5 is preceded with one of the highlighted bold-text labels "CLIENT:" or "SERVER:" to indicate which component of the invention, the client 130 or the server 132, performs that operation in a typical preferred implementation. The processing steps shown in FIGS. 4 and 5 will be explained in conjunction with references to example computing system environment configurations illustrated in FIGS. 6 through 8. Though not specifically labeled as such in FIGS. 6 through 8, a client (130 in FIG. 1) in these examples is the processor 116-1 performing (e.g., executing) the client object manager software 124 (i.e., as a client process) and the server (132 in FIG. 1) is the processor 116-2 performing (e.g., executing) the server object manager software 126 (i.e., as a server process).

Figure 6:
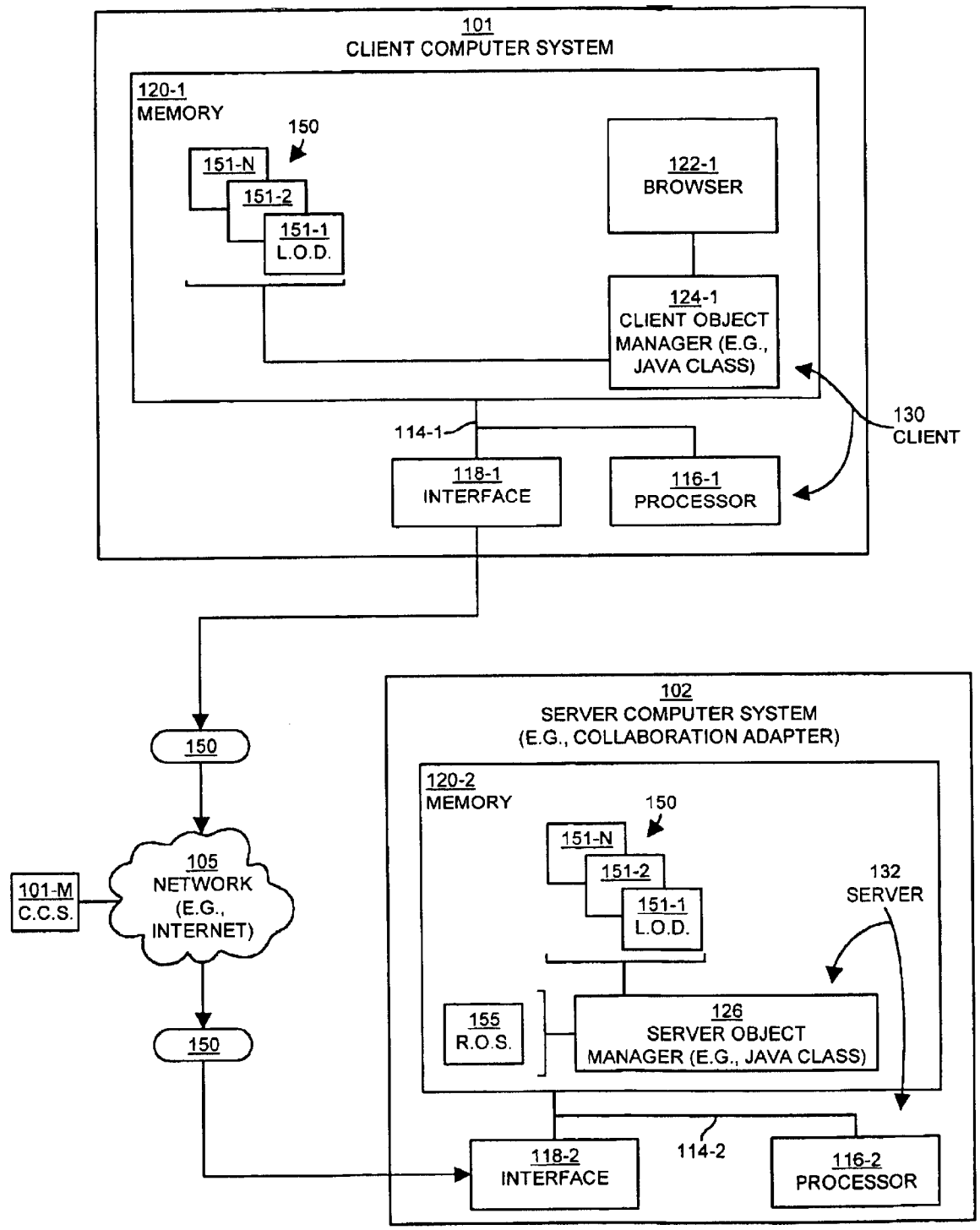
FIG. 6 provides an illustration of a client computer system that operates a client that creates a local object specification and transfers the local object specification to a server computer system for assignment of unique object identifications according to embodiments of the invention.

To begin this example, attention is directed to the example configuration illustrated in FIG. 6. In this example, it is assumed that multiple client computer systems 101 (and, for example, 101-M) may interact with the server computer system 102. Such client computer systems 101 may be collectively involved in a collaboration session in which case the client object manager 124 operating in each client computer system 101 is client collaboration software and the server object manager 126 on the server computer system 102 is server collaboration software. To begin the collaboration session, one client 130 must create shared objects and place those objects on the server computer system 102 for access by other client computer systems 101 which will partake in the collaboration session.

In step 300 in FIG. 4, the first client 130 to create objects for the collaboration session attempts to reserve an object creation right with the server 132, for example, by creating (i.e., attempting to create) a reservation object specification 155 within the memory system 120-2 in the server computer system 102. Essentially, the reservation object specification 155 operates as a lock on the server 132, as will be explained shortly, such that another (e.g., a client 130-M, not shown, on client computer system 101-M) is unable to obtain permission to create objects (e.g., a local and/or global object specification) in conjunction with server 132 if the server 132 already contains an object specification (e.g., reservation object specification 155) within the memory system 120-2.

In step 301, the server 132 receives, from a client 130 (i.e., in response to step 300) the request to reserve and object creation right on the server 132, for example, by receiving the attempt to create a reservation object specification 155 on the server computer system 102.

In response to step 301, the server 132 determines if the client 130 providing the request to reserve the object creation right is able to create an object with the server 132. As an example, the server 132 in step 302 may simply check for (or inherently know of) any existing object specifications (e.g., 150, 160 or a reservation object specification 155) that currently exist in the memory system 120-2 on the server computer system 102. If the server 132 in step 302 is already maintaining an object specification 150, 160 or 155, then the requesting client 130 is not able to create an object on the server computer system 102 at this time and server processing proceeds to step 303 at which point the server 132 provides a denial of the object creation right to the requesting client 130. At this point, processing can proceed to step 300 where the client 130 can re-attempt to reserve and object creation right with the server 132 at a later time.

If in step 302, the server 132 does not detect any existing object specification on the server computer system 102, then the server 132 determines that the client is able to create an object on the server and processing proceeds to step 304.

In step 304, the server 132 in this example embodiment creates a reservation object specification 155 (FIG. 6) in the memory system 120-2 on the server computer system 102 as a placeholder to reserve the server 132 to this client 130 at this time to engage the server 132 in the process of creating a global object specification 160. The reservation object specification 155 may simply be an object definition containing no other object properties other than an object identification. In other words, as explained above, the reservation object specification 155 in this embodiment simply acts as a placeholder or lock on the server computer system 102 so that no other client (e.g., 130M) can begin the process of object creation while the current requesting client 130 creates a local object specification 150 and forwards this to the server 132 for processing according to the invention into a global object specification 160, as will be explained next.

After step 304, processing proceeds to step 305 where the server 132 returns an object creation right (not specifically shown in figures) to the client 130 via the network 105. The object creation right can be, for example, a message sent from the server 132 back to the client 130 acknowledging receipt of the reservation object specification 155 on the server 132. In response to step 304, in step 306 the client 130 receives this acknowledgement indicating the object creation right from the server 132.

Next, in step 307, the client 130 defines a local object specification 150 (FIG. 6) within the memory system 120-1 on the client computer system 101. The local object specification 150, as explained above, includes at least one local object definition 151 having a corresponding local object identification 152 (FIG. 3).

When the client 130 has completed defining all of the required object definitions 151 within the local object specification 150 (step 307), the client 130 in step 308 transfers the local object specification 150 to the server 132 for placement in the memory system 120-2 on the server computer system 102.

In response to step 308, the server 132 in step 309 receives the local object specification 150 from the client 130 and places the local object specification 150 into the memory system 120-2 on the server computer system 102 (see FIG. 6).

Figure 7:
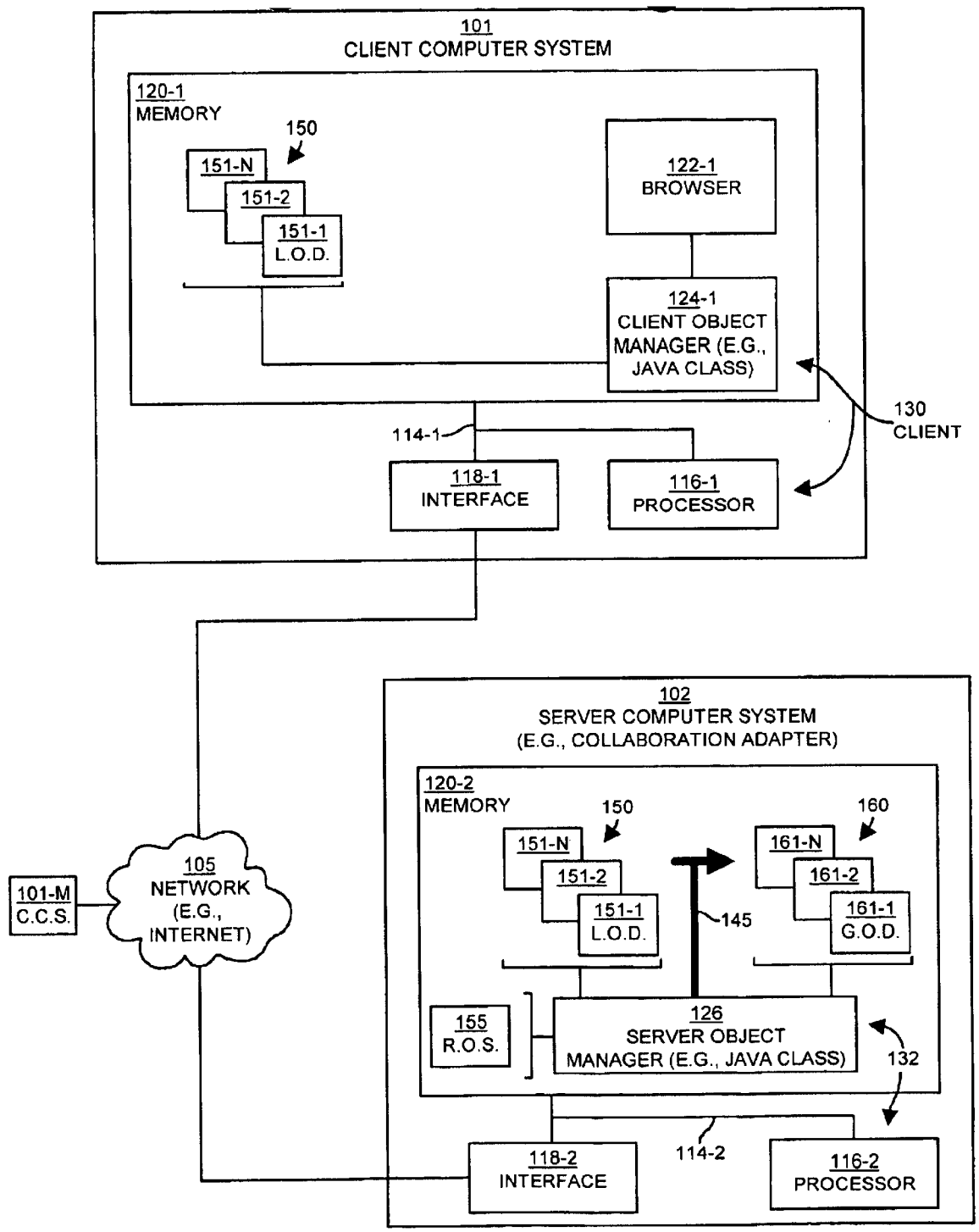
FIG. 7 provides an illustration in which a server computer system operates a server to generate a global object specification including global object definitions that contain unique global object identifications based upon the local object specification provided from a client according to embodiments of the invention.

At this point in processing, the server 132 is ready to convert the local object specification 150 into a global object specification 160 generally as explained above with respect FIGS. 1, 2B and 3, and as will be explained in more detail below with respect to the remainder of the processing steps in the flow charts in FIGS. 4 and 5 and with respect to the example system configuration shown in FIG. 7.

In step 310, the server 132 selects a local object definition 151 within the local object specification 150. Generally, in step 310, the server 132 selects the first local object definition 151-1, though the order of selection is not important.

In step 311 (top of FIG. 5), the server 132 creates a global object definition 161-1 that contains object properties equivalent to object properties of the local object definition 151-1 selected in step 310. As an example of the processing in step 311, the server 132 may copy the local object definition 151 to a newly defined global object definition 161 as illustrated in detail in FIG. 3 and as generally shown in the system configuration in FIG. 7.

Next, in step 312, the server 130 generates a unique global object definition 162 (FIG. 3) for the global object definition 161.

In step 313, the server 132 assigns the unique global object identification 162 to the global object definition 151 created in step 311. If, for example, the process of creating a global object definition 161 in step 311 included copying a local object definition 151 from the local object specification to a newly defined global object definition 161, then in step 313 the server 132 replaces the local object identification value 152 in a global object definition 161 with the newly generated (step 312) global object identification value 162.

Next, in step 314, the server 132 determines if other local object definitions 151 exist in the local object specification 150 for which the server 132 has not yet performed the processing of steps 311 to 313. If other local object definitions 151 exist in the local object specification 150 (i.e., for which the server 132 has not yet created a global object definition 161), processing proceeds to step 315 where the server 132 selects the next local object definition 151-N within the local object specification 150 for processing according to step 311 through 314.

Once the server 132 has processed all of the local object definitions 151 in the local object specification 150 (i.e., once the server has created a corresponding set of global object definitions 161), in step 314, the server 132 will determine that no other local object definitions 151 exist and processing will proceed to step 316.

In step 316, the server 132 provides the newly defined global object specification 160 including the global object definitions 161-1 through 161-N back to the client 130 within the client computer system 101 via the network 105. In response, in step 317, the client 130 receives the global object specification 160 via the network 105 from the server computer system 102.

Next, in step 318, the client 130 within the client computer system 101 determines if the global object specification 160 contains a corresponding global object definition 161 for each respective local object definition 151 in the original local object specification 150 formerly transferred to the server computer system 102 in step 309 (FIG. 4).

Generally, one purpose of step 318 is to ensure that the global object specification 160 which the client 130 receives back from the server 132 contains a corresponding set of global object definitions 161 which are the same, other than their global object identifications 162, to the set of local object definitions 151 originally provided to the server 132. In other words, step 318 is a check to be sure that the server 132 has properly accounted for and mapped all objects originally created by the client 130 to a global set of objects (160) accessible to other clients (e.g., 101-M) from the server.

In step 318, if the client 130 determines that the local in global object specifications 150 and 160 do not contain corresponding object definitions 151 in 161 (e.g., there is a local object definition 151 for which there is no corresponding global object definition 161), processing proceeds to step 319 at which point the client 130 provides an indication of an error back to the server 132 in the server computer system 102. This indicates to the server 132 that it did not properly map the local object specification 150 to the global object specification 160.

However, in step 308 if the object specifications 150 in 160 correlate or correspond to each other, then client processing proceeds to step 320 where the client 130 provides confirmation of acceptance of the global object specification 160 back to the server 132. As an example, in step 320, the client 130 may provide an indication to the server 132 to delete the reservation object specification 155 originally created by the client 130 and steps 300 through 306 (FIG. 4). This action releases the "lock" on the server so that other clients (e.g., 130-M) can interact with the server 132. While not shown in step 320, at this point, the client 130 may also delete the local object specification 150 in the memory system 120-1 since the client 130 has confirmed that the global object specification 160 contains a proper object mapping based on the original local object specification 150. Thus the local object specification 150 is no longer needed on the client computer system 101.

Figure 8:
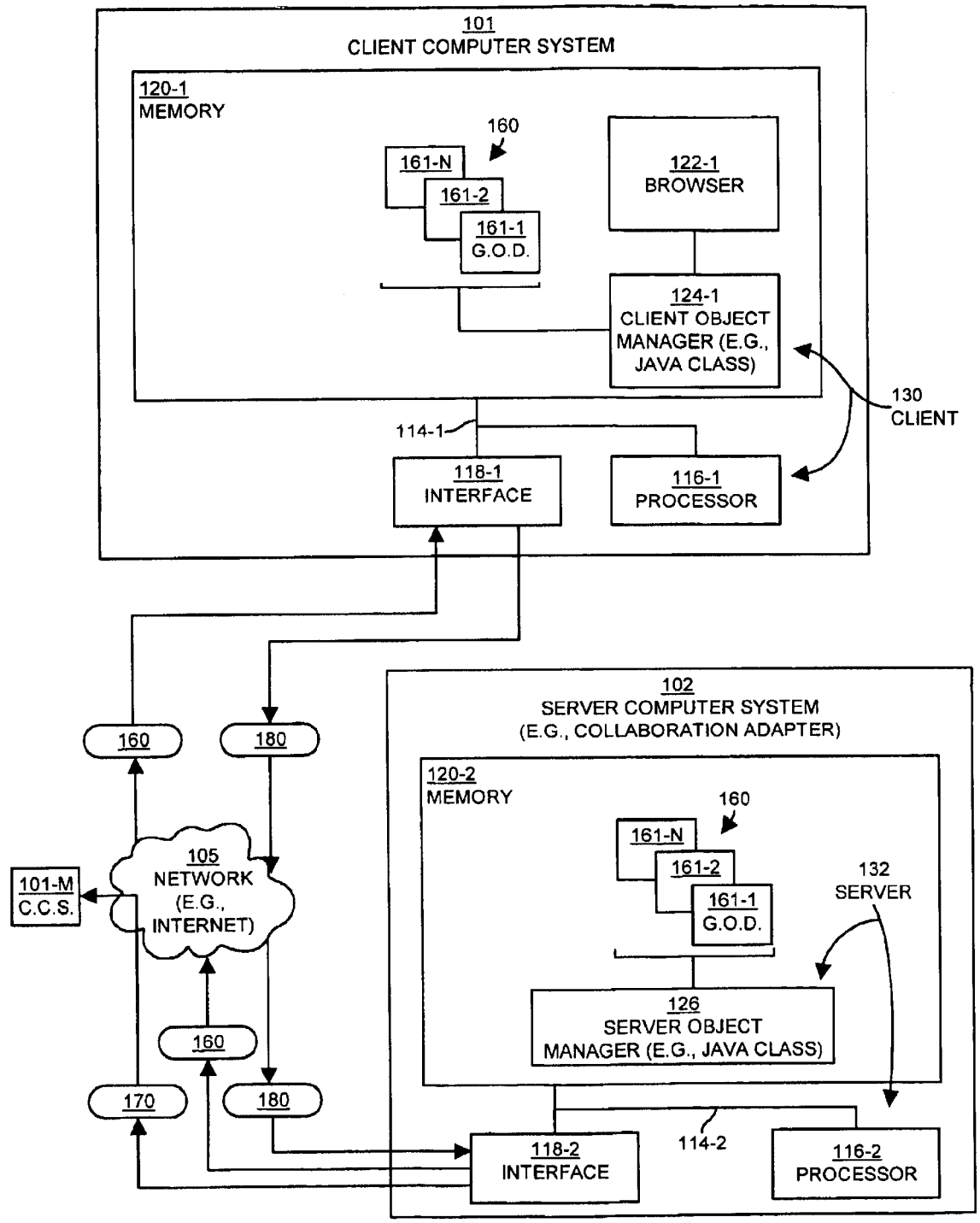
FIG. 8 provides an illustration in which a server computer system returns a global object specification to the client for replacement of the local object specification originally created by the client according to embodiments of the invention.

FIG. 8 illustrates the final resulting configuration of the client and server computer systems 101 and 102 after processing the operations shown in FIGS. 4 and 5. As illustrated, both the client and server computer systems 101 and 102 each contain a copy of the global object specification 160 containing one or more global object definitions 161 which each are guaranteed to contain a respective unique global object identification 162.

In this embodiment, in step 321 in FIG. 5, the server receives the acceptance of the global object specification 160 from the client 130 and provides a global object specification update 170 (FIG. 8) to any other clients operating on other client computer systems 101-M to instruct those other client computer systems 101-M to retrieve the newly updated global object specification 160 from the server 132. In this manner, once the client computer system 101 has performed the processing explained above to create the global object specification 160 of uniquely identified global object definitions 161, and once the server 132 has confirmed this process is complete, the server 132 can allow all other clients 130 in other client computer systems 101-M to obtain the global object specification 160. During a collaboration session, this allows other clients to obtain the set of shared collaboration objects, each of which is guaranteed to uniquely identified due to the operation of the system of the invention.

FIG. 8 also illustrates how a client 130 can provide object operations 180 to the server 132 to perform other aspects of the system of the invention such as adding/creating new object definitions 161 or removing/deleting existing object definitions 161 within an existing global object specification 160 which will be explained next.

Up to this point, the system of the invention has been explained to allow a client 130 to create an object specification which the client 130 then transfers to a server 132 for assignment of a unique global object identification for each object definition within the object specification. This aspect of the system of the invention may be performed during the initiation of a collaboration session in which the client 130 operating in this manner is under control of the user who is starting up or creating the collaboration session. Once the collaboration session has been established in this manner, the client 130 that initiated the collaboration session and the server 132 will each have identical copy of the global object specification 160. Likewise, any other participant users which have requested to join or become a part of the collaboration session, such as a user controlling the client computer system 101-M (e.g., a client 130-M on computer system 101-M) thereafter each obtain the global object specification update from the server 132 in step 321 as explained above. Those other participant clients 130-M at that point can request a copy of the global object specification from the server 132. In response, the server 132 performs the update processing explained above to provide the current set of global object definitions 161 to the client(s) 130-M.

Once a collaboration session is underway, any client 130 through 130-M may require further manipulation of an object definition that already exists (e.g., deletion of an existing object definition) or may require a new object definition (e.g., a new object) to be created. With respect to the system of the invention operating in the context of a collaboration software environment (i.e., where the clients 130 are client collaboration software programs and the server 132 is a collaboration adapter or collaboration server software program), the processing to create new objects or remove exiting objects operates somewhat differently from the aforementioned description of creating a new object specification. In particular, in the case of creation of new objects, once all of the collaboration session participant clients 130 through 130-M obtain the global object specification 160 from the server 132 in response to the server providing the global object specification update 170 (e.g., in response to step 321 in FIG. 5 and as shown in FIG. 8) to those clients 130 through 130-M, those clients 130 through 130-M no longer locally create local object definitions 151 first, prior to interacting with the server 132.

As noted above, FIG. 8 also illustrates an embodiment of the invention in which the client 130 can provide an object operations 180 to the server 132 to further carry out or perform object processing (e.g., creation or deletion of object definitions 161) with respect to existing global object specification 160. Processing of object operations 180 between a client 130 in the server 132 will be explained more detail with respect to the processing steps illustrated in FIG. 9.

Figure 9:
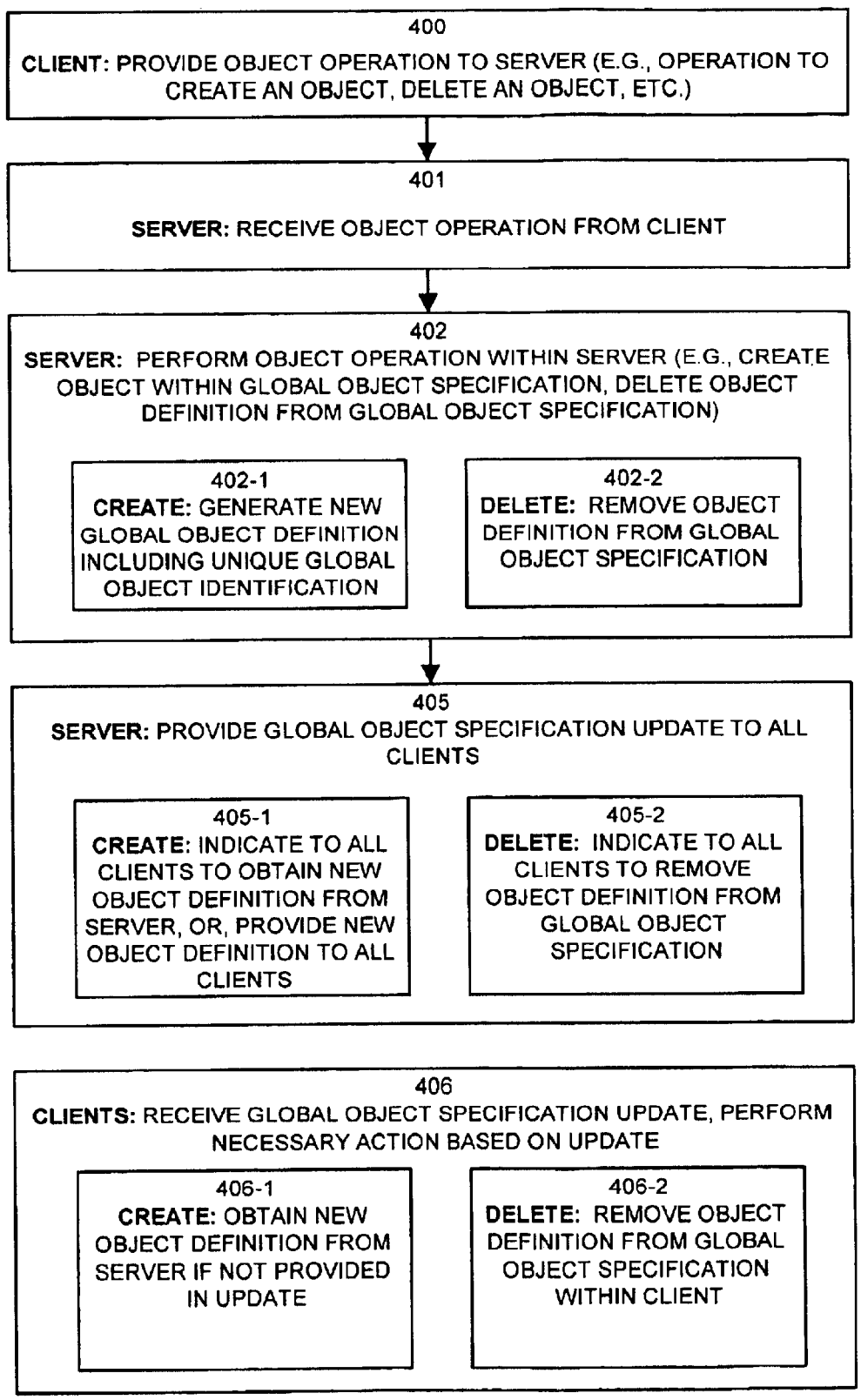
FIG. 9 illustrates a flow chart of processing steps to create and/or delete objects as performed by both a client and a server configured according to embodiments of the invention once the client and server have created and obtained a global object specification as explained with respect to FIGS. 1 through 8.

FIG. 9 illustrates a flow to of processing steps as performed by a client 130 to carry out object operations 180 such as the creation or deletion of an object during a collaboration session with the server 132 once that client 130 has obtained (i.e., has placed in the memory system 120-1) the global object specification 160. In this specific example description, the term object operation means an operation or command 180 to create a new object or remove an existing object from the global object specification 160, though the invention is not limited to these operations.

In step 400, the client 130 provides an object operation 180 to the server 132. In this example, the object operation 180 specifies an operation to create a new object definition 161 or to delete an existing object definition 161 within the global object specification 160 within the server 132. In either case, the client 130 does not first perform the object operation 180 on the client computer system 101 at this point in processing. By way of example, if the object operation 180 is an operation to create a new object definition, in step 400, the client 130 does not first create a local object definition 151 as explained in the former processing operations. In other words, according to the processing of this example embodiment, once the client computer system 101 is in possession of the global object specification 160, the client 130 no longer creates a local object specification 150 containing local object definitions 151. Instead, in step 400, the client 130 simply provides the object operation 180, for example, in the form of the command or message to the server 130.

In step 401, the server 132 receives the object operation 180 (e.g., the message or command) from the client 130.

In response, in step 402, the server 132 performs the object operation 180 upon the global object specification 160 contained within the memory system 122 (e.g., see FIG. 1). The object operation 180 may be, for example, a command or other instruction from the client 130 to the server 132 to have the server 130 create a new object definition(s) 161 within the global object specification 160, or the object operation 180 may be an instruction or command to delete or otherwise remove an existing object definition(s) 161 from the global object specification 160.

In a case in which the object operation 180 is an operation to create a new object, the client 130 provides an object operation 180 that contains any required object properties 163 necessary for creation of a new object definition 161, other than the global object identification 162. To perform a create object operation 180, the server 132 performs the processing of sub-step 402-1, in which the server 132 generates a new global object definition 161 including a new unique global object identification 162 (e.g., see FIG. 3). Any object properties specified in the object operation 180 are also included as object properties 163 (e.g., see FIG. 3) in a new object definition 161.

In a case in which the object operation 180 is an operation to delete or otherwise remove an object definition 161 from the global object specification 160, the object operation 180 specifies one or more global object identifications 162 of the objects which are to be removed from the global object specification 160. As such, the server 132 in step 402 performs sub-step 402-2 to remove the specified object definition(s) 161 from the global object specification 160 as identified by the global object identification(s) 162 within the object operation 180.

At this point, the global object specification 160 within the memory system 120-2 in the server computer system 102 reflects the changes as specified in the object operation 180 as provided from a client 130. Now the system of the invention proceeds to convey these operations to all of the other clients (e.g., client 130-M operating on client computer system 101-M) involved, for example, a collaboration session.

In step 405 the server 132 provides a global object specification update 170 (e.g., see FIG. 8) to all clients 130 involved or participating in the collaboration session.

In particular, for a create object operation 180, the server 132 performs sub-step 405-1 to indicate to all clients 130-1 through 130-M (including the client 130 that initially provides the object operation 180 in step 400) to obtain a new object definition 161 from the server 132. Alternatively, and sub-step 405-1, the server 132 may simply provides the new object definition 161 (i.e., the object definition 161 generated and substep 402-1) to all clients 130-1 through 130-M (including the client 130 initially provides the object operation 180).

For a delete object operation 180, the server 132 performs sub-step 405-2 to indicate to all clients 130-1 through 130-M (including the client 130 that initially provides the object operation 180 in step 400) to remove an object definition 161 from their global object definitions 160 contained within the memory systems 120-1 within each client computer system 101-1 through 101-M.

Next, in step 406, each client 130 (e.g., client 130 on the client computer system 101, as well as any other clients 130-M that operate on other client computer systems 101-M) receives the global object specification update 170 and performs the necessary action based upon the update 170.

In particular, for a create operation 180, the clients 130 perform sub-step 406-1 to obtain the new object definition 161 from the server 132, if the server 132 did not provide the new object definition 161 in the object specification update 170 transmitted from the server 132 in sub-step 405-1. That is, in one embodiment, in step 405, the server 132 provides the global object specification update 170 without specifying the details of the newly created object definition 161. In response, in step 406, the clients 130 can provide a request (not specifically shown in the figures) to the server 132 in order to obtain the details (e.g., the object properties 163 in global object identification 162) from the server 132. Alternatively, in sub-step 405-1, the server 132 may include the details of the newly created global object definition 161 along with the global object specification update 170 such that the clients 130 do not have to perform the extra processing step of retrieving this information from the server 132.

For a delete operation 180, the clients 130 performs sub-step 406-2 to remove the global object definition 161 from the global object specification 160 within the memory system 120-1 within the client computer system 101 as specified by a global object identification 162 contained within the global object specification update 180. In other words, for a delete operation 180 in step 406, the clients 130 simply remove one or more global object definitions 161 from the global object specification 160 as identified by a list of one or more global object identifications 162 specified within the global object specification update 170.

In this manner, for either a create or delete object operation 180, the clients 130 first provide the requested object operation 180 to the server 132 which then carries out or performs the requested object operation 180 (creation or deletion of the global object definition 161) on the global object specification 160 maintained by the server 132. Then, the server 132 provides an indication of this operation (i.e., via the update 170) to all clients that participate in the collaboration session, including the client that initially provided the object operation 180. This technique ensures or guarantees that no clients 130 (i.e., the client providing an object operation 180) can modify or otherwise manipulate object definitions 161 within their global object specifications 160 (i.e., the global object specifications 160 in the memory systems 120-1 on each client computer system 101) until such operations were object manipulations (object operation 180) are carried out on the master global object specification 160 maintained by the server 132. In other words, this technique guarantees that the server must first perform any requested object operation 180 on the global object specification 160 maintained by the server before any client 130 performs a corresponding operation to the global object specification 160 maintained by that client 130.

Those skilled in the art will understand that there can be many variations made to the operations, techniques and mechanisms explained above while still achieving the same objectives of the invention. Such variations are intended to be covered by the scope of this invention.

For example, in an alternative embodiment of the invention, the global object specification 160 that the server 132 returns to the client 130 might be simply a list of global object identifications 162 (i.e., packaged as a global object specification 160 without the other object properties 163). In this manner, though the client 130 may provide a complex local object specification 150 that contains many local object definitions 151 to each contain many object properties 153 in addition to the local object identification properties 152, once the server 132 has processed the local object definition 150 as explained above to create a duplicate global object specification 160, instead of returning an exact copy of this global object specification 160 back to the client 130 (i.e., including global object definitions 161 containing all of the global object properties 163), the server 132 can simply provide a stripped-down or property-less version of the global object specification 160 back to the client that contains global object definitions 161 that only contain the global object identification property 162.

It is to be understood that the server 132 can still maintain a complete global object specification 160 containing a complete set of global object definitions 161 that contain all of the corresponding properties 163, that correspond to the properties 153 of the local object definitions 151. This is because the server 153 may need to provide complete global object definitions 161 (that are based on all of the properties 153 of the local object definitions 151) to other clients involved, for instance, a collaboration session. However, in this example embodiment, the server 152 does not need to return the complete global object specification 160 including all of the properties 163 back to the client 130 which initially provided the local object specification 150 to the server 132. Instead, by having a server 132 simply provide a new list of global object identifications 162 (which can be contained in the stripped down version of a global object specification 160) back to the client 130, the client 130 can receive this list of global object identifications 162 and can replace each local object identification 152 within each corresponding local object definition 151 in the local object specification 150 with these global object identifications 162. In this manner, the client 130 does not have to remove or delete the local object specification 150. Instead, in this alternative configuration, the client 130 can simply treat the local object specification 150 as a global object specification 160 once each local object definition 151 has been re-assigned with a new global object identification 162. This alternative configuration conserves network bandwidth since the server 132 does not have to return other properties 163 associated with the global object definitions 161 to the client 130, other than the global object identification properties 162 for each global object definition 161.

As another example of such a variation of the aforementioned example descriptions, it is to be understood that the processing steps of the aforementioned flowcharts may be rearranged will still accomplishing the objectives of the present invention. Those skilled in the art of computer programming a really understand that there might be many ways to implement a software system that accomplishes the goals of the invention as claimed. As such, the foregoing description of embodiments of the invention are not intended to be limiting. Rather, any limitations to embodiments of the invention are presented in the following claims.

What is claimed is:

1. In a client computer system, a method for defining objects, the method comprising the steps of:

providing a local object specification to a server;

receiving a global object specification from the server, the global object specification including at least one global object definition having a unique global object identification;

checking whether the global object specification received from the server contains a corresponding global object definition for each respective local object defined in the local object specification provided to the server; and generating a signal indicating whether the global object specification and the local object specification define common object definitions.

2. The method of claim 1 wherein the step of providing the local object specification to the server includes the steps of:

reserving an object creation right with the server; in response to reserving the object creation right with the server, defining the local object specification to include at least one local object definition and a corresponding local object identification that is unique to the at least one local object on the client; and transferring the local object specification to the server.

3. The method of claim 2 wherein the step of reserving an object creation right with the server includes the step of:

checking for an existence of an object specification on the server, and if no object specification exists on the server, creating a reservation object specification on the server in order to reserve the object creation right with the server on behalf of the client, and if an object specification exists on the server, receiving a denial of the object creation right for the client.

4. The method of claim 1 wherein the step of generating a signal indicating whether the global object specification and the local object specification define common object definitions includes the steps of:

if the global object specification contains a corresponding global object definition for each respective local object defined in the local object specification, then replacing the local object specification in the client with the global object specification received from the server; and If the global object specification does not contain a corresponding global object definition for each respective local object defined in the local object specification, then providing the indication of an error to the server.

5. The method of claim 1 wherein the signal indicates that the global object specification and the local object specification define common object definitions and wherein the method further comprising the steps of:

in response to the signal indicating that the global object specification and the local object specification define common object definitions, providing a confirmation of acceptance of the global object specification to the server to indicate to the server to send an update to other clients such that the other clients can create objects in conjunction with the server.

6. The method of claim 5 wherein the step of releasing the object creation right with the server comprises the step of providing an indication to the server to delete a reservation object specification on the server that reserve the object creation right with the server on behalf of the client.

7. The method of claim 1 wherein the step of receiving the global object specification receives a global object specification containing global object definitions that correspond to respective local object definitions in the local object specification, the global object definitions having respective global object identifications that are unique amongst all global object definitions created by the server.

8. The method of claim 7 wherein:

the client is client collaboration software performing on a client computer system involved in a collaboration session with the server; the server is collaboration adapter software operating on a collaboration computer system; and wherein the method further comprises the step of:

at the client computer system, determining that the server properly created the global object specification by verifying that local object definitions in the local object specification is identical to global object definitions in the global object specification; and in response to determining that the server properly created the global object specification, providing confirmation of acceptance of the global object specification to the server such that the server can update the global object specification of other client computer systems performing client collaboration software such that all clients involved in the collaboration session with the server contain the global object definitions having unique global object identifications.

9. In a server computer system, a method for defining objects, the method comprising the steps of:

receiving a local object specification from a client;

for each local object definition in the local object specification, defining, within a global object specification, a corresponding global object definition including a unique global object identification;

providing the global object specification to the client;

receiving, from the client, a request to reserve an object creation right on the server;

checking if the client is able to create an object on the server, and if the client is able to create an object on the server, returning an object creation right to the client, and if the client is not able to create an object on the server, providing a denial of the object creation right to the client;

in response to returning the object creation right to the client, receiving, from the client, a reservation object specification on the server that reserves the object creation right on behalf of the client; and creating the reservation object specification on the server in order to reserve the object creation right with the server on behalf of the client.

10. The method of claim 9 wherein the step of defining, within a global object specification, a corresponding global object definition including a unique global object identification comprises the steps of:

creating a global object definition that contains object properties equivalent to object properties of the local object definition to which the global object definition corresponds;

generating an object identification for the unique global object identification that is unique amongst all global object identifications assigned to any existing global object definitions known to the server; and assigning the unique global object identification to the global object definition such that the global object definition is uniquely identified amongst all global object definitions.

11. The method of claim 10 wherein the step of creating a global object definition that contains object properties equivalent to object properties of the local object definition to which the global object definition corresponds comprises the step of:

copying the local object definition in the local object specification to a global object definition within the global object specification to generate the global object definition which is a copy of the local object definition; and wherein the step of assigning the unique global object identification to the global object definition replaces the local object identification copied to the global object definition with the unique global object identification generated by the step of generating an object identification for the unique global object identification.

12. The method of claim 9 further including the step of: associating the global object definition to the global object specification.

13. The method of claim 9 wherein the step of receiving, from a client, a request to reserve an object creation right on the server comprises the steps of:

receiving an attempt to create a reservation object specification from the client in order to reserve the object creation right with the server on behalf of the client; and wherein, if the step of checking if the client is able to create an object on the server determines that the client is able to create an object in the server, the method further includes the step of:

creating a reservation object specification on the server in order to reserve the object creation right with the server on behalf of the client.

14. The method of claim 9 further comprising the steps of:

receiving a confirmation of acceptance of the global object specification provided to the client; and providing a global object specification update to other clients such that the other clients can retrieve the global object specification from the server.

15. The method of claim 14 further comprising the steps of: receiving a request from the other clients for the global object specification; and in response to receiving the request from the other clients for the global object specification, providing the global object specification to the other clients.

16. A method for defining shared objects on a client and a server, the method comprising the steps of:

providing, from the client, a local object specification to the server; receiving, in the server, the local object specification from the client; in the server, for each local object definition in the local object specification, defining, within a global object specification, a corresponding global object definition including a unique global object identification;

providing, from the server, the global object specification to the client;

receiving, at the client, the global object specification from the server; and comparing, in the client, the global object specification to the local object specification to determine that the server properly created the global object specification based upon the local object specification, and if the server properly created the global object specification, replacing the local object specification in the client with the global object specification received from the server, and if the server improperly created a global object specification, providing from the client an indication of an error to the server.

17. A client computer system comprising:

an interface;

a processor;

a memory system; and an interconnection mechanism coupling the interface, the processor and the memory system;

wherein the memory system is encoded with an client object manager process that, when performed on the processor, operates as a client to cause the client computer system to define shared objects by performing the operations of:

providing a local object specification defined in the memory system to a server via the interface;

receiving, in the memory system, a global object specification from the server via the interface;

checking whether the global object specification received from the server contains a corresponding global object definition for each respective local object defined in the local object specification provided to the server; and generating a signal in the memory system indicating whether the global object specification and the local object specification define common object definitions having respective unique object identifiers.

18. The client computer system of claim 17 wherein when the processor performs the operation of providing the local object specification to the server, the processor further performs the operations of:

reserving an object creation right with the server; and in response to reserving the object creation right with the server, defining a local object specification in the memory system to include at least one local object definition and a corresponding local object identification that is unique to the at least one local object on the client; and transferring the local object specification to the server via the interface.

19. The client computer system of claim 18 wherein when the processor performs the operation of reserving an object creation right with the server, the processor further performs the operations of:

checking for an existence of an object specification on the server, and if no object specification exists on the server, creating a reservation object specification on the server in order to reserve the object creation right with the server on behalf of the client, and if an object specification exists on the server, receiving, via the interface, a denial of the object creation right for the client.

20. The client computer system of claim 18 wherein when the processor performs the operation of generating a signal indicating whether the global object specification and the local object specification define common object definitions, the processor further performs the operations of:

if the global object specification contains a corresponding global object definition for each respective local object defined in the local object specification, then replacing the local object specification in the memory system in the client with the global object specification received from the server; and if the global object specification does not contain a corresponding global object definition for each respective local object defined in the local object specification, then providing the indication of an error to the server via the interface.

21. The client computer system of claim 17 wherein the signal indicates that the global object specification and the local object specification define common object definitions and wherein the processor further performs the operations of:

in response to the signal indicating that the global object specification and the local object specification define common object definitions, providing a confirmation of acceptance of the global object specification to the server, via the interface, to indicate to the server to send an update to other clients such that the other clients can create objects in conjunction with the server; and releasing the object creation right with the server.

22. The client computer system of claim 21 wherein when the processor performs the operation of releasing the object creation right with the server, the processor performs the operation of providing an indication to the server, via the interface, to delete a reservation object specification on the server that reserve the object creation right with the server on behalf of the client.

23. The client computer system of claim 17 wherein when the processor performs the operation of receiving the global object specification the processor performs the operation of:

receiving, via the interface, a global object specification containing global object definitions that correspond to respective local object definitions in the local object specification, the global object definitions having respective global object identifications that are unique amongst all global object definitions created by the server.

24. The client computer system of claim 23 wherein:

the client is client collaboration software performing on a client computer system involved in a collaboration session with the server;

the server is collaboration adapter software operating on a collaboration computer system; and wherein the processor further performs the operation of:

in response to determining that the server properly created the global object specification, providing confirmation of acceptance of the global object specification to the server via the interface such that the server can update the global object specification of other client computer systems performing client collaboration software such that all clients involved in the collaboration session with the server contain the global object definitions having unique global object identifications.

25. A server computer system comprising:

an interface;

a processor;

a memory system; and an interconnection mechanism coupling the interface, the processor and the memory system;

wherein the memory system is encoded with a server object manager process that, when performed on the processor, operates as a server to cause the server computer system to define objects by performing the operations of:

receiving a local object specification from a client via the interface;

for each local object definition in the local object specification, defining, within a global object specification in the memory system, a corresponding global object definition including a unique global object identification; and providing the global object specification from the memory system to the client via the interface;

receiving, from a client, a request to reserve an object creation right on the server;

checking if the client is able to create an object on the server, and if the client is able to create an object on the server, returning an object creation right to the client, and if the client is not able to create an object on the server, providing a denial of the object creation right to the client;

in response to returning the object creation right to the client, receiving, from a client via the interface, a reservation object specification on the server that reserves the object creation right on behalf of the client; and creating the reservation object specification in the memory system on the server in order to reserve the object creation right with the server on behalf of the client.

26. The server computer system of claim 25 wherein when the processor performs the operation of defining, within a global object specification, a corresponding global object definition including a unique global object identification the processor performs the operations of:

creating a global object definition in the memory system that contains object properties equivalent to object properties of the local object definition to which the global object definition corresponds; and generating an object identification for the unique global object identification that is unique amongst all global object identifications assigned to any existing global object definitions known to the server; and assigning the unique global object identification to the global object definition in the memory system such that the global object definition is uniquely identified amongst all global object definitions in the memory system.

27. The server computer system of claim 26 wherein when the processor performs the operation of creating a global object definition that contains object properties equivalent to object properties of the local object definition to which the global object definition corresponds the processor performs the operations of:

copying the local object definition in the local object specification to a global object definition within the global object specification to generate the global object definition which is a copy of the local object definition; and wherein the step of assigning the unique global object identification to the global object definition replaces the local object identification copied to the global object definition with the unique global object identification generated by the step of generating an object identification for the unique global object identification.

28. The server computer system of claim 27 wherein the processor further performs the operation of:

associating the global object definition to the global object specification.

29. The server computer system of claim 25 wherein when the processor performs the operation of receiving, from a client, a request to reserve an object creation right on the server, the processor performs the operations of:
  receiving, via the interface, an attempt to create a reservation object specification from the client in order to reserve the object creation right with the server on behalf of the client; and
  wherein, if the step of checking if the client is able to create an object on the server determines that the client is able to create an object in the server, the method further includes the step of:
    creating a reservation object specification on the server in order to reserve the object creation right with the server on behalf of the client.

30. The server computer system of claim 25 wherein the processor further performs the operations of:
  receiving, via the interface from the client, a confirmation of acceptance of the global object specification provided to the client; and providing a global object specification update, via the interface to other clients such that the other clients can retrieve the global object specification from the server.

31. The server computer system of claim 25 wherein the processor further performs the operations of:
  receiving, via the interface, a request from the other clients for the global object specification in the memory system; and
  in response to receiving the request from the other clients for the global object specification, providing the global object specification in the memory system to the other clients via the interface.

32. The server computer system of claim 25 wherein the server computer system is a collaboration server and wherein the server object manager process encoded in the memory system is server collaboration software that, when performed on the processor, operates as a collaboration server to allow distribution of the global object specification to multiple client computer systems involved in a collaboration session.

33. A system for defining objects on a client and a server, the system comprising the steps of:
  a client computer system configured with a client;
  a server computer system configured with a server;
  a network interconnecting the client computer system and the server computer system;
  the client providing a local object specification to the server via the network;
  the server receiving the local object specification from the client via the network;
  for each local object definition in the local object specification, the server defining, within a global object specification, a corresponding global object definition including a unique global object identification;
  the server providing the global object specification to the client via the network;
  the client receiving the global object specification from the server; and
  the client comparing the global object specification to the local object specification to determine whether the server properly created the global object specification based upon the local object specification by determining whether the global object specification and the local object specification define common object definitions, and if the server properly created the global object specification, replacing the local object specification in the client with the global object specification received from the server, and if the server improperly created a global object specification, providing from the client an indication of an error to the server.

34. A computer program product having a computer-readable medium including computer program logic encoded thereon for defining objects in a client, such that the computer program logic, when performed on at least one processor within a client computer system, causes the at least one processor to perform the operations of:
  providing a local object specification to a server;
  receiving a global object specification from the server;
  checking whether the global object specification received from the server contains a corresponding global object definition for each respective local object defined in the local object specification provided to the server; and
  generating a signal indicating whether the global object specification and the local object specification define common object definitions having respective unique object identifiers.

35. A computer program product having a computer-readable medium including computer program logic encoded thereon for defining objects in a server, such that the computer program logic, when performed on at least one processor within a server computer system, causes the at least one processor to perform the operations of:
  receiving a local object specification from a client;
  for each local object definition in the local object specification, defining, within a global object specification, a corresponding global object definition including a unique global object identification;
  providing the global object specification to the client;
  receiving, from a client, a request to reserve an object creation right on the server;
  checking if the client is able to create an object on the server, and if the client is able to create an object on the server, returning an object creation right to the client, and if the client is not able to create an object on the server, providing a denial of the object creation right to the client;
  in response to returning the object creation right to the client, receiving, from a client via the interface, a reservation object specification on the server that reserves the object creation right on behalf of the client; and
  creating the reservation object specification in the memory system on the server in order to reserve the object creation right with the server on behalf of the client.

36. The computer program product of claim 35 wherein the computer program logic that causes the at least one processor to perform the operation of defining, within a global object specification, a corresponding global object definition including a unique global object identification, comprises computer program logic that when performed on the processor, causes the at least one processor to perform the operations of:
  creating a global object definition that contains object properties equivalent to object properties of the local object definition to which the global object definition corresponds;
  generating an object identification for the unique global object identification that is unique amongst all global object identifications assigned to any existing global object definitions known to the server; and assigning the unique global object identification to the global object definition such that the global object definition is uniquely identified amongst all global object definitions.

37. In a client computer system as in claim 1, the method further comprising the steps of:

providing an object operation to the server from the client performing on the client computer system;

receiving, at the client, a global object specification update from the server, the global object specification update indicating that the server performed the object operation on a global object specification maintained by the server; and in response to receiving the global object specification update, performing the object operation on a global object specification maintained by the client.

38. The method of claim of claim 37 wherein the object operation is a create object operation, and wherein the step of providing the object operation to a server comprises the steps of:

defining at least one object property for a global object definition to be created by the server;

providing the object operation to the server including the at least one object property; and wherein the step of receiving receives the global object specification update containing a new global object identification for a new global object definition to be created in the global object specification in the client computer system; and wherein the step of performing the object operation on a global object specification maintained by the client includes the steps of: generating the global object definition within the global object specification on the client computer system, the global object definition containing the at least one object property and containing the global object identification received from the global object specification update.

39. The method of claim of claim 36 wherein the object operation is a delete object operation, and wherein the step of providing the object operation to a server comprises the steps of:

defining at least one object property for a global object definition to be deleted from a global object specification maintained by the server; providing the object operation to the server including the at least one object property; and wherein the step of receiving receives the global object specification update containing a global object identification of an existing global object definition in the global object specification in the client computer system; and wherein the step of performing the object operation on a global object specification maintained by the client includes the steps of: removing a global object definition within the global object specification that corresponds to the global object identification received from the global object specification update.

40. In a client computer system, a method for defining objects, the method comprising the steps of:

from the client computer system:

providing a local object specification to a server, the local object specification including at least one local object definition generated by the client computer system;

at the client computer system:

receiving a global object specification from the server, the global object specification including at least one global object definition having a unique global object identification, wherein the server generates the unique global object identification associated with the at least one global object specification, the unique global object identification generated by the server being different than a client generated identifier provided with the local object specification; and generating a signal indicating whether the global object specification and the local object specification include at least one matching object definition.

41. A method as in claim 40 wherein generating the signal includes:

at the client computer system, comparing the at least one local object definition in the local object specification to the at least one global object definition in the global object specification to identify whether the server properly created the global object specification.

42. A method as in claim 41 further comprising:

checking whether the global object specification contains a corresponding global object definition for each respective local object defined in the local object specification; and if the global object specification contains a corresponding global object definition for each respective local object defined in the local object specification, replacing the local object specification in the client with the global object specification received from the server.

43. A method as in claim 42 further comprising:

if the global object specification does not contain a corresponding global object definition for each respective local object defined in the local object specification, providing the indication of an error to the server.

44. A method as in claim 1 further comprising:

ensuring that the server properly creates and manages a precise set of objects the client computer system provides the server by, at the client computer system:

comparing the local object specification provided to the server with the global object specification received from the server; and utilizing the unique global object identification provided by the server to identify the global object specification.

45. A method as in claim 1 further comprising:

providing a high degree of certainty that the unique object identification, as generated by the server, is unique across all clients that access an object definition associated with a corresponding unique object identification.

46. A method as in claim 9, wherein defining a corresponding global object definition includes:

at the server computer system, replacing an identifier associated with the received local object specification with the unique global object identification so that an object specification associated with the received local object specification is globally unique; and providing the unique global object identification along with the global object specification to the client.

* * * * *